(12) United States Patent
Tajima et al.

(10) Patent No.: US 6,832,779 B2
(45) Date of Patent: Dec. 21, 2004

(54) AIRBAG DEVICE FOR PASSENGER'S SEATS

(75) Inventors: Koh Tajima, Aichi-ken (JP); Yasushi Okada, Aichi-ken (JP); Junichi Asanuma, Aichi-ken (JP); Tatsuo Hirano, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 162 days.

(21) Appl. No.: 10/024,367

(22) Filed: Dec. 21, 2001

(65) Prior Publication Data

US 2002/0084635 A1 Jul. 4, 2002

(30) Foreign Application Priority Data

Dec. 28, 2000 (JP) .................................... 2000-403092

(51) Int. Cl.[7] .............................................. B60R 21/16
(52) U.S. Cl. ................... 280/743.1; 280/740; 280/742
(58) Field of Search ................................ 280/729, 732, 280/740, 743.1, 742

(56) References Cited

U.S. PATENT DOCUMENTS

| | | | | |
|---|---|---|---|---|
| 4,003,588 A | * | 1/1977 | Oka et al. ................. | 280/743.1 |
| 4,010,055 A | * | 3/1977 | Oka et al. .................... | 156/226 |
| 5,140,799 A | * | 8/1992 | Satoh .......................... | 53/429 |
| 5,316,337 A | * | 5/1994 | Yamaji et al. ............. | 280/743.1 |
| 5,478,113 A | * | 12/1995 | Rogers ...................... | 280/743.1 |
| 5,593,179 A | * | 1/1997 | Maruyama .................. | 280/740 |
| 5,855,393 A | * | 1/1999 | Keshavaraj ............... | 280/743.1 |
| 5,865,467 A | * | 2/1999 | Bito et al. ............... | 280/743.1 |
| 5,975,571 A | * | 11/1999 | Ford et al. ............... | 280/743.1 |
| 6,017,058 A | * | 1/2000 | Ross ....................... | 280/743.1 |
| 6,129,382 A | * | 10/2000 | Tonooka ................... | 280/743.1 |
| 6,168,203 B1 | * | 1/2001 | Amamori .................. | 280/743.1 |
| 6,299,206 B1 | * | 10/2001 | Keshavaraj ............... | 280/743.1 |
| 6,439,606 B2 | * | 8/2002 | Okada et al. ............. | 280/743.1 |
| 6,478,332 B1 | * | 11/2002 | Ono et al. ................ | 280/743.2 |

FOREIGN PATENT DOCUMENTS

| | | | |
|---|---|---|---|
| JP | 5-305851 | * | 11/1993 |
| JP | 5-305852 | * | 11/1993 |
| JP | 2001-63508 | * | 3/2001 |
| JP | 2002-187515 | * | 7/2002 |

* cited by examiner

Primary Examiner—Paul N. Dickson
Assistant Examiner—Toan C To
(74) Attorney, Agent, or Firm—Posz & Bethards, PLC

(57) ABSTRACT

A passenger's seat airbag device comprises an airbag including a passenger's side wall portion and a peripheral wall portion. The passenger's side wall portion is arranged generally in the vertical direction when the airbag is completely inflated. The peripheral wall portion is formed to converge, when the airbag is completely inflated, generally into a conical shape from the outer peripheral edge of the passenger's side wall portion forward of the vehicle. The airbag is so constructed that the gas inlet port for an open face generally in the horizontal direction is arranged in front of the lower side of the peripheral wall portion by mounting the gas inlet port peripheral wall on a case. The airbag is housed in a case by folding it horizontally and vertically after preliminarily folded. In the airbag preliminarily folded, the portion near the upper edge in the passenger's side wall portion is arranged at a position to confront the gas inlet port. In the preliminarily folded airbag, moreover, the passenger's side wall portion is flatly overlaid on the lower side of the peripheral wall portion.

7 Claims, 35 Drawing Sheets

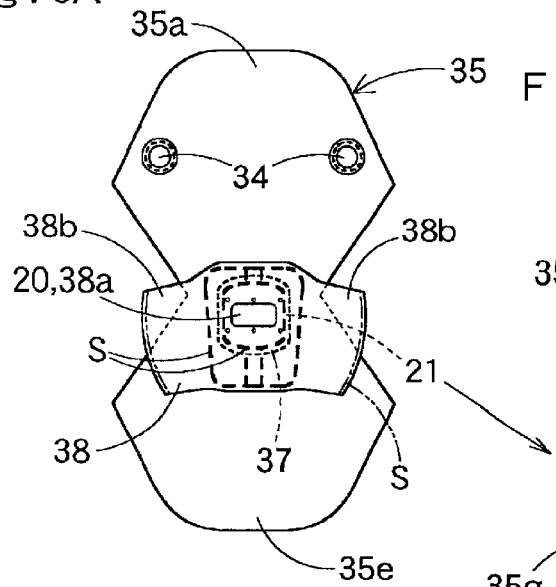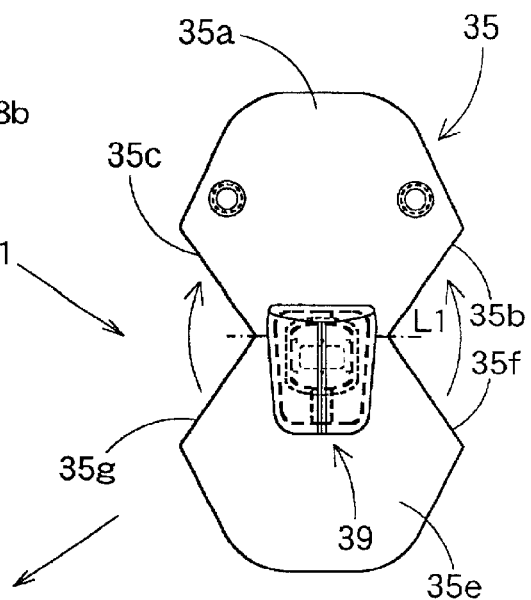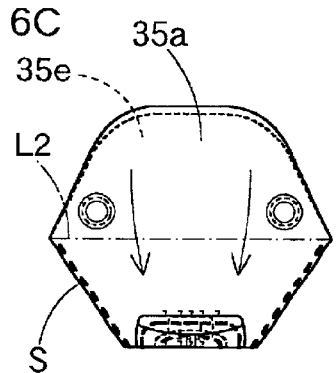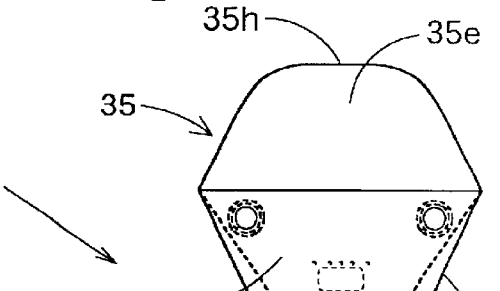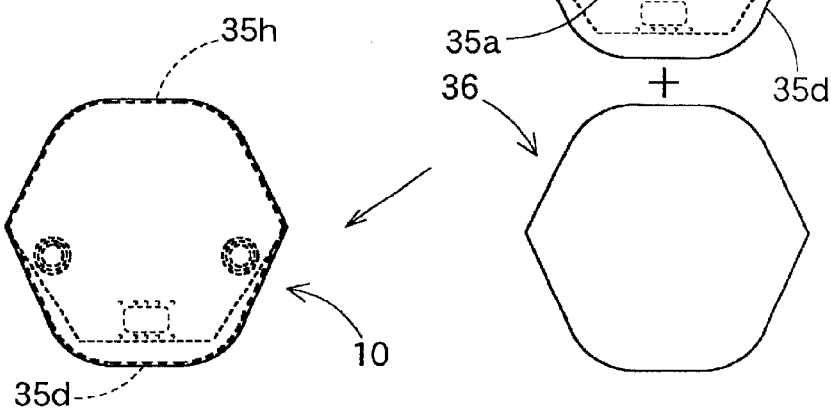

UPWARD ← → DOWNWARD

UPWARD ← → DOWNWARD

AIRBAG DEVICE FOR PASSENGER'S SEATS

This application claims priority from Japanese patent application of Tajima et al, filed Dec. 28, 2000, No. 2000-403092, the complete disclosure of which is hereby incorporated into the present application by this reference.

BACKGROUND OF THE INVENTION

1. Field of the Invention

The present invention relates to a passenger's seat airbag device to be arranged in an instrument panel (as will be shortly referred to as the "in-pane") in front of a passenger's seat.

2. Description of the Related Art

In the passenger's seat airbag device of the prior art, the airbag is constructed to include an opening side wall portion having a gas inlet port for introducing an inflating gas, and a passenger's side wall portion for confronting the passenger when the airbag is extended/inflated. This airbag is folded up and housed in a case which is arranged in the in-pane in front of the passenger's seat. When the inflating gas is introduced, moreover, the airbag is extended/inflated to protrude from the opening in the upper face of the in-pane backward of the vehicle (as referred to Unexamined Published Japanese Patent Application No. 11-278192).

The airbag of this kind is desired to protrude, when extended/inflated, toward the passenger in a widely open state and at a suppressed moving velocity so that it may not apply a partial pushing force to the passenger.

In the airbag of the prior art, therefore, the passenger's side wall portion is horizontally and vertically folded in such predetermined manners that it is flatly overlapped close to the opening side wall portion side. Moreover, the airbag is guided, when extended/inflated, to protrude along the windshield toward the passenger. At this time, the passenger's side wall portion is arranged with a wide opening and generally in the vertical direction.

SUMMARY OF THE INVENTION

However, the airbag has been troubled by the following problems, if it is provided, when completely extended/inflated, with the passenger's side wall portion and the peripheral wall portion. The passenger's side wall portion is arranged generally in the vertical direction on the passenger's side when the airbag is completely extended/inflated. The peripheral wall portion is narrowed generally into a conical shape forward of the vehicle from the outer peripheral edge of the passenger's side wall portion. A gas inlet port is arranged as an open face generally in the horizontal direction in front of the lower side of the peripheral wall portion when the extension/inflation is completed. Moreover, the airbag is mounted at its gas inlet port peripheral edge in the case.

In this airbag, the peripheral edge of the gas inlet port of the peripheral wall portion is arranged generally in the horizontal direction when the airbag is completely inflated by itself. Moreover, the passenger's side wall portion is arranged generally in the vertical direction. In other words, the peripheral edge of the gas inlet port is generally normal to the passenger's sidewall portion which is arranged generally in the vertical direction. Even if the horizontal or vertical folding is done by overlapping the passenger's side wall portion so flatly on the peripheral wall portion as comes closer to the gas inlet port, therefore, there arises a problem that the passenger's side wall portion is hard to arrange quickly generally in the vertical position when the airbag is extended/inflated.

The present invention has been conceived to solve the above-specified problems and has an object to provide a passenger's seat airbag device which can arrange the passenger's side wall portion quickly generally in the vertical direction with respect to the gas inlet port peripheral edge when the airbag is extended/inflated.

The object of the present invention can be achieved by a passenger's seat airbag device having the following construction.

Here, the longitudinal and transverse directions are taken herein to correspond to the longitudinal and transverse direction of a vehicle running straight, with respect to the state in which the passenger's seat airbag device is mounted on the vehicle. Moreover, the upper edge and the lower edge of the passenger's side wall portion in the airbag are taken with respect to the state in which the airbag is completely extended/inflated.

According to an aspect of the present invention, there is provided a passenger's seat airbag device comprising: an airbag folded up and housed in a case for being extended/inflated and protruded backward of a vehicle while pushing and opening a door arranged in an instrument panel, by introducing an inflating gas thereinto from a gas inlet port.

The airbag includes, as a shape when completely extended/inflated:

a passenger's side wall portion arranged on the passenger's side and generally in a vertical direction; and a peripheral wall portion converging generally into a conical shape from the outer peripheral edge of the passenger's side wall portion forward of the vehicle.

The gas inlet port is arranged as an open face on the front side on the lower side of the peripheral wall portion when the airbag is completely extended/inflated.

The gas inlet port is mounted at its peripheral edge on the case.

The airbag is so shaped, when preliminarily folded, that a portion near the upper edge of the passenger's sidewall portion is arranged at a position to confront the gas inlet port to lay the passenger's side wall portion flatly on the lower side of the peripheral wall portion.

In the passenger's seat airbag device of the aforementioned construction, the airbag introduces, when extended/inflated, the inflating gas thereinto from the gas inlet port so that it is extended/inflated while eliminating the horizontal and vertical creases. At the position to confront the gas inlet port at the preliminarily folding time of the airbag, there is arranged the portion which is near the upper edge of the passenger's side wall portion. Therefore, the portion near the upper edge of the passenger's side wall portion to confront the gas inlet port is forcibly pushed up prior to the remaining portions such as the portion of the lower edge side of the passenger's side wall portion by the pushing force of the inflating gas just introduced. As a result, the passenger's side wall portion can be easily arranged generally in the vertical direction.

If the portion near the upper edge of the passenger's sidewall portion is forcibly pushed up, moreover, the horizontal and vertical creases can be quickly eliminated. Therefore, the passenger's side wall portion can be widely extended.

In the passenger's seat airbag device according to the present invention, therefore, the passenger's sidewall portion to take the position generally perpendicular to the gas inlet port peripheral edge can be quickly arranged generally in the vertical direction when the airbag is extended/inflated. Moreover, the airbag can be extended in the widely open state so that no partial pushing force may be applied to the passenger's side.

In the aforementioned passenger's seat airbag device, it is preferred that when the airbag is preliminarily folded, the peripheral wall portion is folded up to extend substantially all the area of the passenger's side wall portion flatly.

With this construction of the preliminarily folded shape of the airbag, substantially all the area of the passenger's side wall portion may be flatly extended and folded up on the peripheral wall portion side when the airbag is preliminarily folded. Therefore, it is possible to do the preliminarily folding work of the airbag conveniently. Moreover, substantially all the area of the passenger's side wall portion is flatly extended at the preliminarily folding time so that the airbag can move more easily toward the passenger's side while being extended widely vertically and transversely than the case in which the passenger's side wall portion is folded up. As a result, the moving velocity of the passenger's side wall portion to the passenger's side can be further suppressed.

In the passenger's seat airbag device, moreover, in the preliminarily folded shape of the airbag, it is preferable that the portion of the peripheral wall portion on the upper side of the gas inlet port is folded up within the range on the front side from the vicinity of the rear edge of the gas inlet port.

In the case of this construction, the portion of the peripheral wall portion over the gas inlet port may be folded up on the front side of the front or rear edge of the gas inlet port or folded up to clog the gas inlet port. With this construction, however, there can be obtained the following actions and effects.

Specifically, the portion of the peripheral wall portion over the gas inlet port is folded up within the range from the rear edge to the front side of the gas inlet port but not to extend largely backward from the gas inlet port. When the inflating gas flows in from the gas inlet port, moreover, the portion of the passenger's side wall portion near the upper edge is pushed up through the portion of the peripheral wall portion on the upper side of the gas inlet port. At this time, the portion itself of the peripheral wall portion on the upper side of the gas inlet port is also pushed up. Moreover, the portion of the peripheral wall portion on the upper side of the gas inlet port is unfolded to leave the gas inlet port as it is pushed up. Therefore, the portion near the upper edge of the passenger's side wall portion comes into a state to confront the gas inlet port directly. As a result, the passenger's side wall can be easily arranged generally in the vertical direction.

With the construction described above, therefore, the action to arrange the passenger's side wall portion quickly generally in the vertical direction is not obstructed even if the portion of the peripheral wall portion over the gas inlet port is interposed between the gas inlet port and the portion near the upper edge of the passenger's side wall portion. Of course, the passenger's side wall portion can be more quickly arranged generally in the vertical direction if the portion of the peripheral wall portion on the upper side of the gas inlet port is folded up on the front side of the rear edge of the gas inlet port. If the portion of the peripheral wall portion on the upper side of the gas inlet port is folded up on the front side of the front edge of the gas inlet port, moreover, the passenger's side wall portion can be more quickly arranged generally in the vertical direction.

In the aforementioned passenger's seat airbag device, moreover, in the preliminarily folded shape of the airbag, it is preferred:

that the portions of the peripheral wall portion on the left and right sides of the gas inlet port are so folded to form valley creases in the longitudinal direction that the intermediate portion of the flatly extended passenger's side wall portion to the left and right edges is brought close to the gas inlet port and arranged at the passenger's side wall portion side at the peripheral edge of the gas inlet port, and that the portion of the peripheral wall portion near the joint to the upper edge of the passenger's side wall portion is folded to form valley creases in the transverse direction.

With the aforementioned construction of the preliminarily folded shape of the airbag, the airbag is folded up at its peripheral wall portion symmetrically with respect to the gas inlet port, so that it can be easily preliminarily folded.

In the preliminarily folded shape of the airbag in the aforementioned construction, the peripheral wall portion can be preliminarily folded by gripping and pulling the two predetermined portions of the airbag away from each other. One gripped portion is located at a substantially intermediate portion in the peripheral wall portion between the transversely central portion of the front edge side of the gas inlet port and the transversely central portion at the upper edge of the passenger's side wall portion. Moreover, the other gripped portion is located at the transversely central portion of the peripheral wall portion on the back side of the gas inlet port. Moreover, the pulling work is done by pulling those gripped portions in the longitudinal direction away from each other. By this pulling work, the portions of the peripheral wall portion on the left and right sides of the gas inlet port can be individually folded up to form valley creases in the longitudinal direction. Moreover, the portions of the peripheral wall portion near the joint to the upper edge of the passenger's side wall portion can be folded up to form the valley creases in the transverse direction. Merely by gripping and pulling the predetermined portions of the peripheral wall portion, therefore, the peripheral wall portion can be easily preliminarily folded. As a result, the preliminarily folding work can be made more convenient.

In the passenger's seat airbag device, still moreover, it is preferred that the valley creases in the peripheral wall portion near the joint to the passenger's side wall portion upper edge and in the transverse direction are arranged on the front side of the rear edge of the gas inlet port.

With this construction, the gas inlet port can easily confront the upper edge near portion of the passenger's side wall portion directly. Therefore, the pushing force of the inflating gas to push the upper edge near portion of the passenger's side wall portion can be enhanced to act directly on the upper edge near portion. As a result, the passenger's side wall portion can be more easily arranged in the vertical direction.

In the passenger's seat airbag device, still moreover, it is preferred that the valley creases in the peripheral wall portion near the joint to the passenger's side wall portion upper edge and in the transverse direction are arranged on the front side of the front edge of the gas inlet port.

With this construction, the portion of the peripheral wall portion to be jointed to the passenger's side wall portion upper edge is not arranged at the position to confront the gas inlet port. Therefore, the gas inlet port can easily confront the upper edge near portion of the passenger's side wall portion more directly.

In the passenger's seat airbag device, still moreover, in the preliminarily folded shape of the airbag, it is preferred that the vicinity of the substantially intermediate portion on the lower side of the peripheral wall portion between the gas inlet port and the passenger's side wall portion lower edge is so folded in that it is arranged close to the lower edge side of the passenger's side wall portion and near the rear end of the peripheral wall portion on the passenger's side wall portion side.

In the folded-up shape of this construction, the peripheral wall portion is folded up to form a tuck at the peripheral wall portion on the back side of the gas inlet port thereby to extend substantially all the area of the passenger's side wall portion flatly. Even if the distance from the gas inlet port of the airbag to the passenger's side wall portion is elongated to make the longitudinal size of the peripheral wall portion on the lower side longer, therefore, the airbag can be easily preliminarily folded by adjusting the length of the tuck.

Here, the case in which the distance from the gas inlet port of the airbag to the passenger's side wall portion is elongated can be easily coped with by the following folding method. At the portion from the front edge side of the gas inlet port in the peripheral wall portion to the upper edge of the passenger's side wall portion, more specifically, the folding work may be done by forming the transverse creases to enlarge the longitudinal length of the portions to be folded in. Moreover, the valley creases may be formed in multiplicity.

In the passenger's seat airbag device, in the preliminarily folded shape of the airbag, it is arbitrary:

that the portion to be arranged at a position to confront the gas inlet port is made of a portion of the peripheral wall portion near the upper edge of the passenger's side wall portion; and that the upper edge of the passenger's side wall portion is arranged on the back side of the rear edge of the gas inlet port.

In connection with the preliminarily folded shape, more specifically, the portion to be arranged at the position to confront the gas inlet port, i.e, the portion of the passenger's side wall portion near the upper edge side may be either the portion of the passenger's side wall portion itself or the portion of the peripheral wall portion. If the portion near the upper edge of the passenger's side wall portion is on the peripheral wall portion as in the aforementioned construction, moreover, the portion of the peripheral wall portion near the upper edge side of the passenger's side wall portion is forcibly pushed up in advance at the initial stage of the extension/inflation of the airbag. Moreover, the passenger's side wall portion is arranged at its upper edge side in the vicinity of the portion to confront the gas inlet port. Therefore, the passenger's side wall portion is also quickly arranged generally in the vertical direction as the portion to confront the gas inlet port is extended (i.e., the portion of the peripheral wall portion near the upper edge side of the passenger's side wall portion). At this time, the upper edge itself of the passenger's side wall portion is arranged on the back side of the rear edge of the gas inlet port. Therefore, the passenger's side wall portion being extended/inflated is arranged generally in the vertical direction while being suppressed in its height. As a result, the passenger's side wall portion being extended/inflated and arranged generally in the vertical direction is moved to the back side in the height-suppressed state. This behavior of the airbag can protect the passenger properly without applying a partial pushing force to the passenger, when the seated passenger has a small height.

BRIEF DESCRIPTION OF THE DRAWINGS

FIGS. 6A to 6E are views showing the steps of manufacturing the airbag to be used in the same embodiment;

DESCRIPTION OF THE PREFERRED EMBODIMENTS

Figure 1:
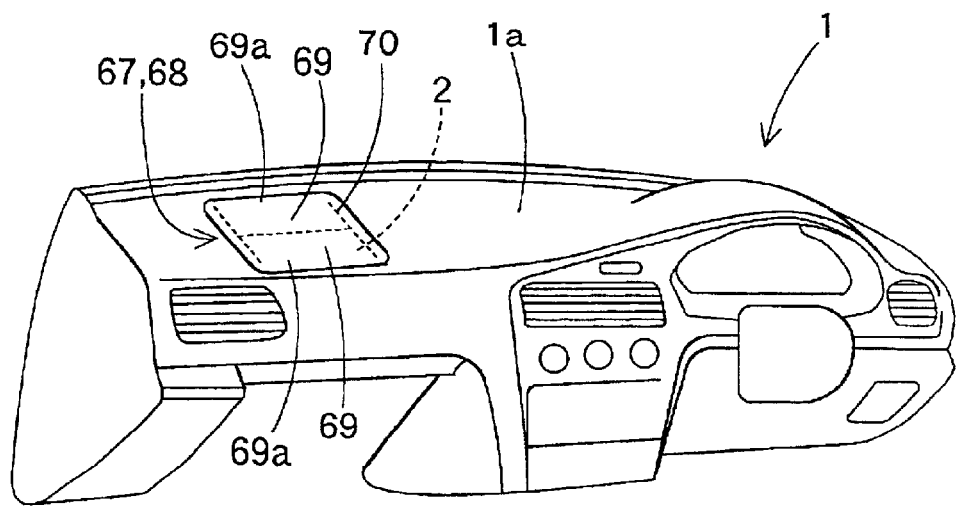
FIG. 1 is a perspective view showing an instrument panel, in which a passenger's airbag device according to one embodiment of the present invention is mounted.

The invention will be described below by way of embodiments shown in the drawings. In addition, the invention is not limited to the embodiments. All modifications within the requirements of the claims and equivalents with respect to the requirements should be included in the scope of the claims.

One embodiment of the present invention will be described with reference to the accompanying drawings.

Figure 2:
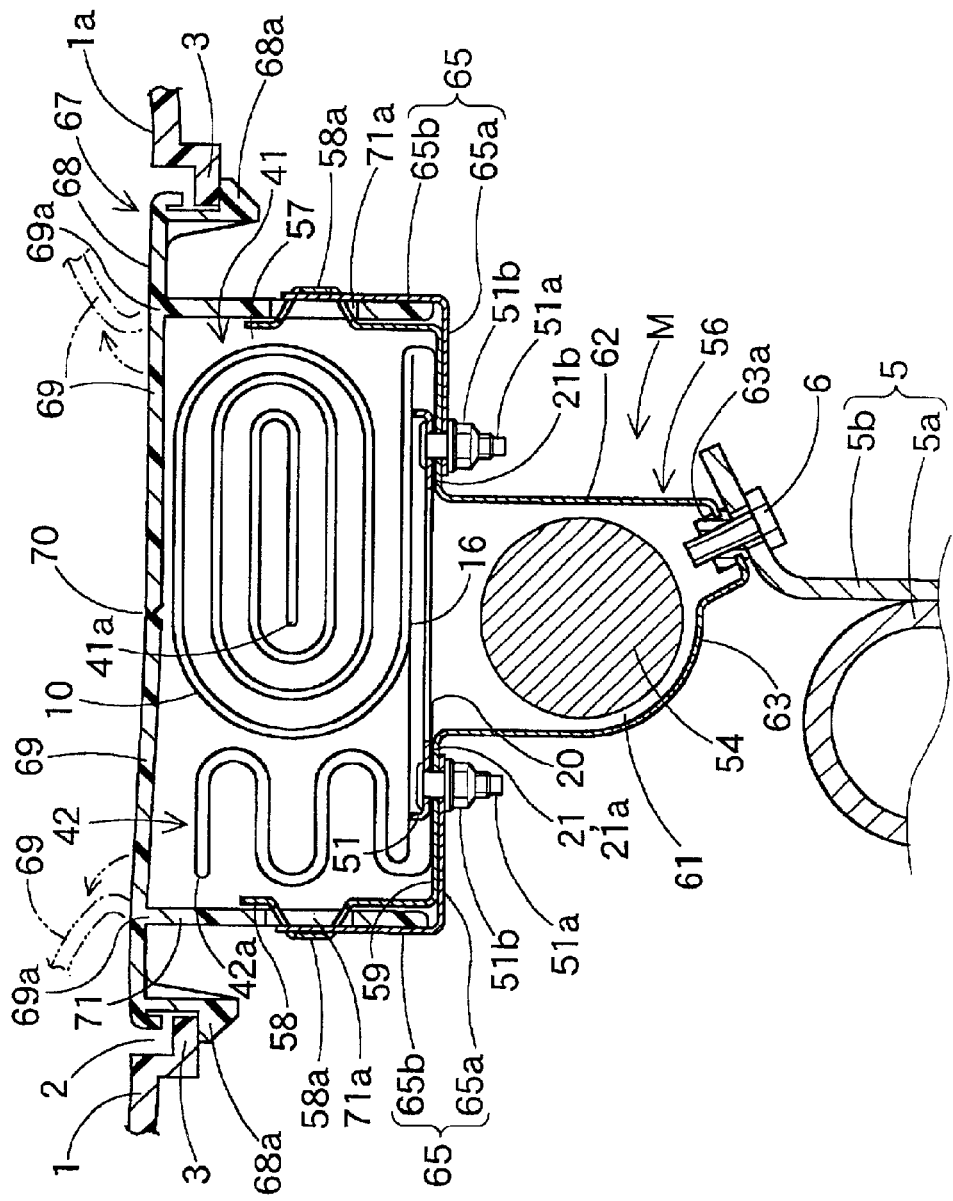
FIG. 2 is a sectional view showing a used mode of the same embodiment and taken in the longitudinal direction of the vehicle.

A passenger's seat airbag device M of the embodiment is of the top mount type, in which it is arranged in the upper face 1a of the surface of an in-pane (i.e., instrument panel) 1, as shown in FIGS. 1 and 2. This airbag device M comprises an airbag 10, an inflator 54, a case 56, a retainer 51, an airbag cover 67 and holding plates 65. The airbag 10 is folded up and housed in the case 56. The inflator 54 feeds the airbag 10 with an inflating gas. The case 56 houses and holds the airbag 10 and the inflator 54. The retainer 51 is retains the airbag 10 in the case 56. The airbag cover 67 covers the folded-up airbag 10. Moreover, the holding plates 65 are arranged in two and are constructed to joint the airbag cover 67 firmly on the case 56.

The retainer 51 for mounting the airbag 10 in the case 56 is made of a sheet metal into a rectangular annular shape. This retainer 51 has a plurality of downward extending bolts 51a at predetermined positions. The retainer 51 inserts the individual bolts 51a into the later-described mounting holes 22 of the airbag 10. Moreover, the retainer 51 further inserts the individual bolts 51a into the later-described bottom wall portion 59 and horizontal plate portions 65a of the case 56 and the holding plates 65. By fastening nuts 51b on the individual bolts 51a inserted in the bottom wall portion 59 and the horizontal plate portions 65a, moreover, the retainer 51 is mounted on the case 56.

The inflator 54 is of the cylinder type. The inflator 54 is housed and held in the later-described lower chamber 61 of the case 56.

Figure 16:
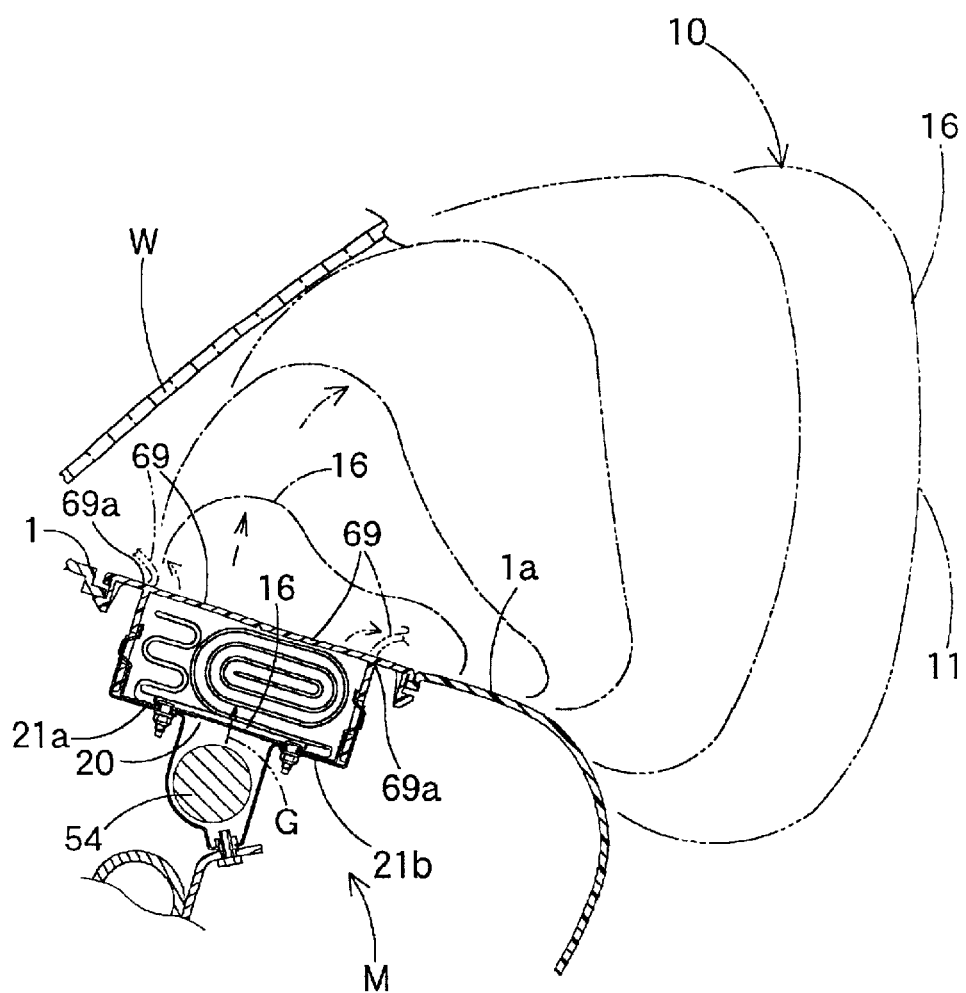
FIG. 16 is a view for explaining the acting time of the same embodiment and is taken from the side of the vehicle.
Figure 17:
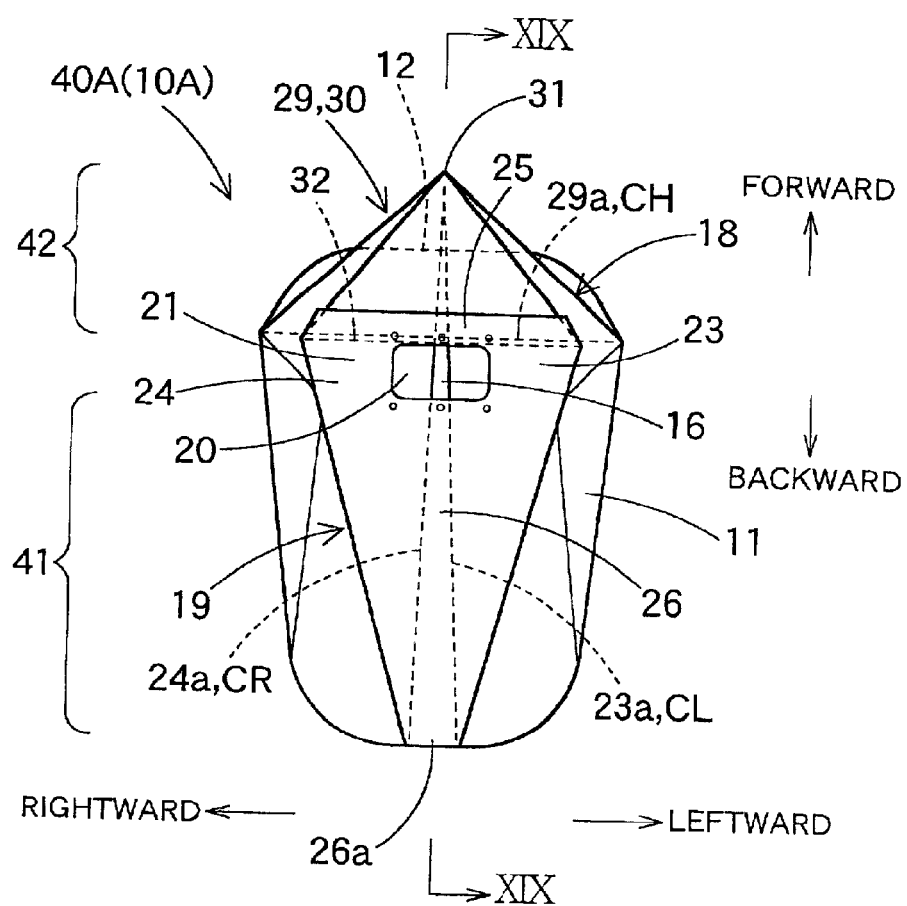
FIG. 17 is a view showing an airbag of another embodiment, after preliminarily folded, and is taken from the side of the gas inlet port.
Figure 18:
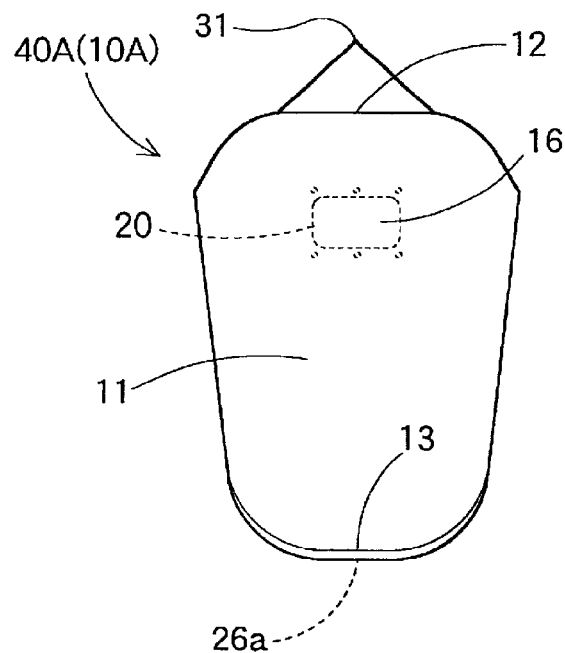
FIG. 18 is a view showing the preliminarily folded airbag shown in FIG. 17 and is taken from the side of the passenger's side wall portion.

The airbag cover 67 is made of a thermoplastic elastomer of the olefin or ester group. The airbag cover 67 comprises a ceiling wall portion 68 and a sidewall portion 71. The ceiling wall portion 68 is arranged to close an opening 2 which is opened in a rectangular shape in the in-pane 1. The side wall portion 71 is formed generally into a square cylinder shape extending downward from the lower face of the ceiling wall portion 68. Inside of the ceiling wall portion 68, as surrounded by the side wall portion 71, thinned rupturable portions 70 are arranged in the periphery, and two door portions 69 are longitudinally arranged. The rupturable portions 70 are arranged generally in the shape of letter "H", as viewed downward of the ceiling wall portion 68. The individual door portions 69 are opened to the two sides of the longitudinal direction of the vehicle, as indicated by double-dotted lines in FIGS. 2 and 16, when they are pushed and ruptured by the airbag 10 being inflated. At this time, hinge portions 69a are provided on the longitudinal end portion sides of the door portions 69, as apart from the rupturable portions 70. At the edges of the ceiling wall portion 68 in the longitudinal direction of the vehicle, moreover, there are formed a plurality of retaining legs 68a which are protruded downward. The individual retaining legs 68a are retained on the lower face side of a flange portion 3 which is formed with a step on the peripheral edge of the opening 2 of the in-pane 1. In the side wall portion 71, there are formed a plurality of retaining holes 71a which are located at portions in the longitudinal direction of the vehicle and extended through in the longitudinal direction of the vehicle. By using those retaining holes 71a and holding plates 65, the sidewall portion 71 is jointed to the later-described upper chamber 57 of the case 56.

The holding plates 65 are made of a sheet metal. Each holding plate 65 is formed to have an L-shaped section composed of the horizontal plate portion 65a and a vertical plate portion 65b. This vertical plate portion 65b is formed to extend upward from the end portion of the horizontal plate portion 65a. The holding plates 65 are arranged individually at portions in the longitudinal direction of the vehicle of the case 56. In each horizontal plate portion 65a, moreover, there is formed the (not-shown) through hole, into which each bolt 51a of the retainer 51 is to be inserted. The upper end of each vertical plate portion 65b is so formed that it can be inserted into the later-described retaining protrusion 58a of the case 56.

The case 56 is made of a sheet metal. The case 56 comprises the upper chamber 57 and the lower chamber 61. The upper chamber 57 is formed into a box shape having an opened upper side. The lower chamber 61 is so arranged on the lower side of the case 56 as to continuous with the upper chamber 57.

The upper chamber 57 comprises a peripheral wall portion 58 and the bottom wall portion 59. The peripheral wall portion 58 is formed generally into a rectangular cylindrical shape. The bottom wall portion 59 is arranged below the peripheral wall portion 58. From the peripheral wall portion 58, there are protruded outward the retaining protrusions 58a. The individual retaining protrusions 58a are formed to be inserted into the individual retaining holes 71a of the airbag cover side wall portion 71. In the bottom wall portion 59, there are formed the (not-shown) through holes, into which the individual bolts 51a of the retainer 51 are to be inserted. On the lower side of the portions of the bottom wall portion 59 in the longitudinal direction of the vehicle, there are individually arranged in abutment the horizontal wall portions 65a of the holding plates 65.

The lower chamber 61 comprises a peripheral wall portion 62 and a bottom wall portion 63. The peripheral wall portion 62 is formed generally into such a rectangular cylindrical shape as to extend downward from the inner side end portion of the bottom wall portion 59. The bottom wall portion 63 closes the lower end of the peripheral wall portion 62. On the bottom wall portion 63, there are mounted nuts 63a for mounting the case 56 on a body 5. The bottom wall portion 63 is mounted on a bracket 5b extending from a reinforcement 5a on the body 5 side. By fastening bolts 6 into the nuts 63a through the (not-shown) joint holes formed in the bracket 5b, more specifically, the bottom wall portion 63 is mounted on the bracket 5b.

Figure 3:
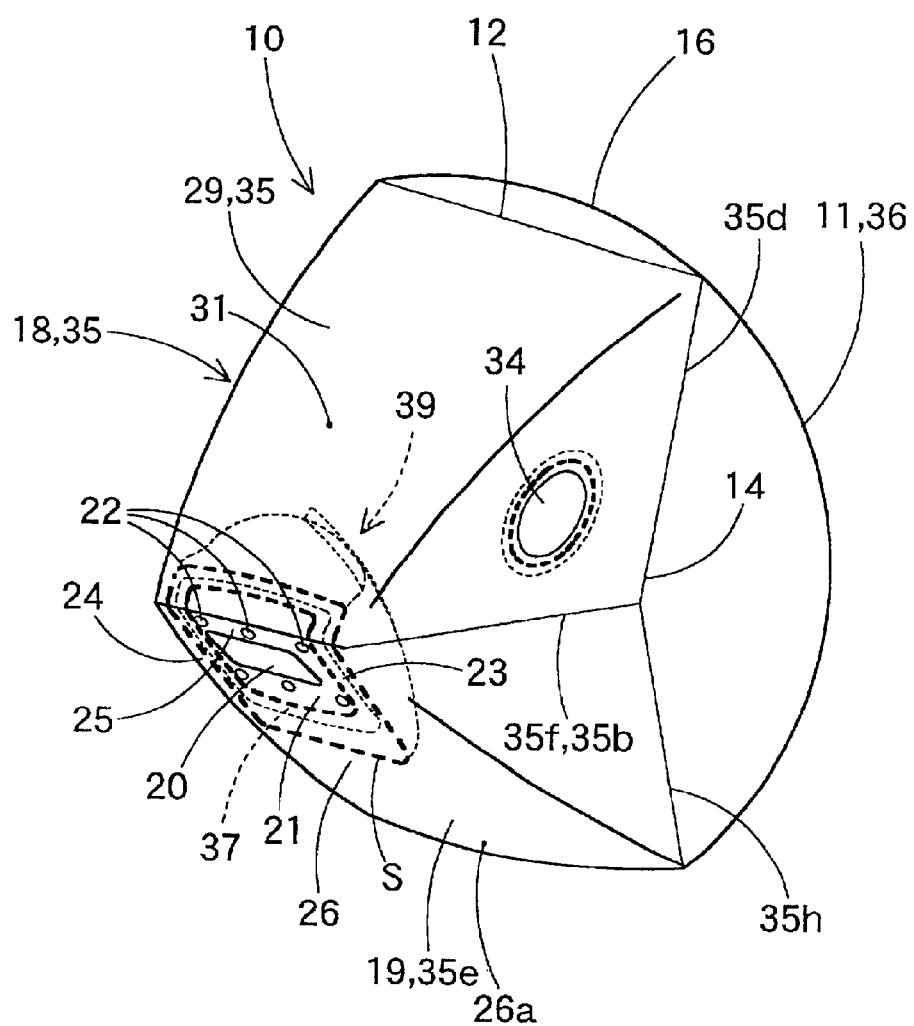
FIG. 3 is a perspective view showing the state, in which an airbag to be used in the same embodiment is inflated by itself.
Figure 4:
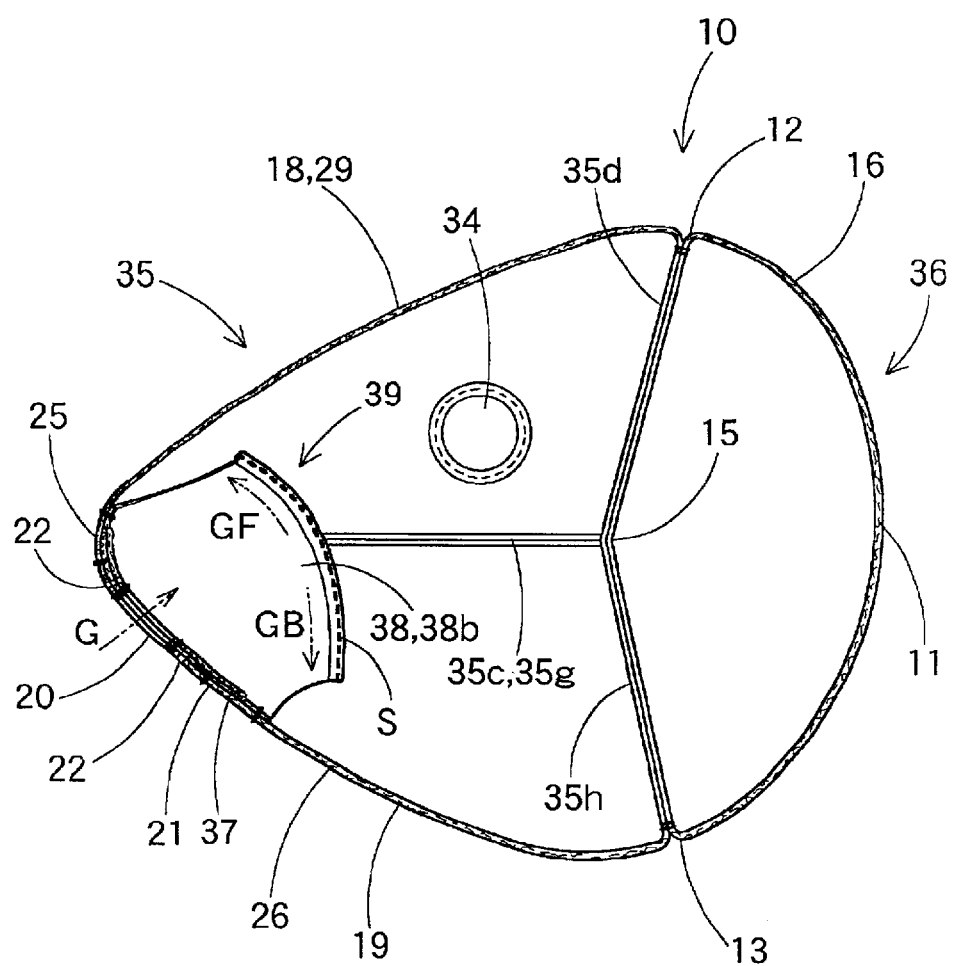
FIG. 4 is a sectional view showing the state, in which the airbag to be used in the same embodiment is inflated by itself, and taken in the longitudinal direction of the vehicle.

The airbag 10 is formed, as shown in FIGS. 3 and 4, into a shape having a passenger's sidewall portion 11 and a peripheral wall portion 18 when completely extended/inflated. The passenger's side wall portion 11 is arranged on the passenger's side and generally in the vertical direction when the airbag 10 was completely inflated. The peripheral wall portion 18 is formed to converge generally into a conical shape from the outer peripheral edge of the passenger's wall portion 11 forward of the vehicle when the airbag 10 is completely inflated. In the front side of a lower side peripheral wall 19, moreover, there is formed a gas inlet port 20 which is opened in a rectangular shape. The lower side peripheral wall 19 is a portion providing the lower side of the peripheral wall portion 18 at the end of the extension/inflation, as shown in FIGS. 3 and 4. The gas inlet port 20 is provided for introducing an inflating gas G (as referred to FIG. 4) into the airbag 10.

Here in the embodiment, a straightening cloth 39 is so arranged in the airbag 10 as to cover the gas inlet port 20. The straightening cloth 39 changes the flow of the inflating gas G to flow into the airbag 10.

Moreover, the mounting holes 22 are extending through the peripheral edge 21 of the gas inlet port 20. By inserting the individual bolts 51a of the retainer 51 into those mounting holes 22, the airbag 10 is retained on the bottom wall portion 59 of the case 56. In the left and right side face portions of the peripheral wall portion 18, on the other hand, there are individual formed vent holes 34. These vent holes 34 discharge the excess inflating gas. Near the mounting holes 22 in the peripheral edge of the gas inlet port 20 on the side of the inner periphery of the airbag 10, moreover, there is arranged a reinforcing cloth 37. This reinforcing cloth 37 is formed of threads of polyester or polyamide generally into a rectangular annular shape.

Moreover, the airbag 10 is retained on the case bottom wall portion 59 by the retainer 51, and the case 56 is mounted on the body 5 so that the airbag device M is mounted on the vehicle. Then, the open face of the gas inlet port 20 is arranged, as will be described in the following. Specifically, the open face of the gas inlet port 20 is so arranged that the side of a front edge 21a of the peripheral edge 21 is slightly higher than the side of a rear edge 21b. Moreover, the open face of the gas inlet port 20 is arranged together with the opening peripheral edge 21 generally in the horizontal direction (as referred to FIG. 16).

Figure 5:
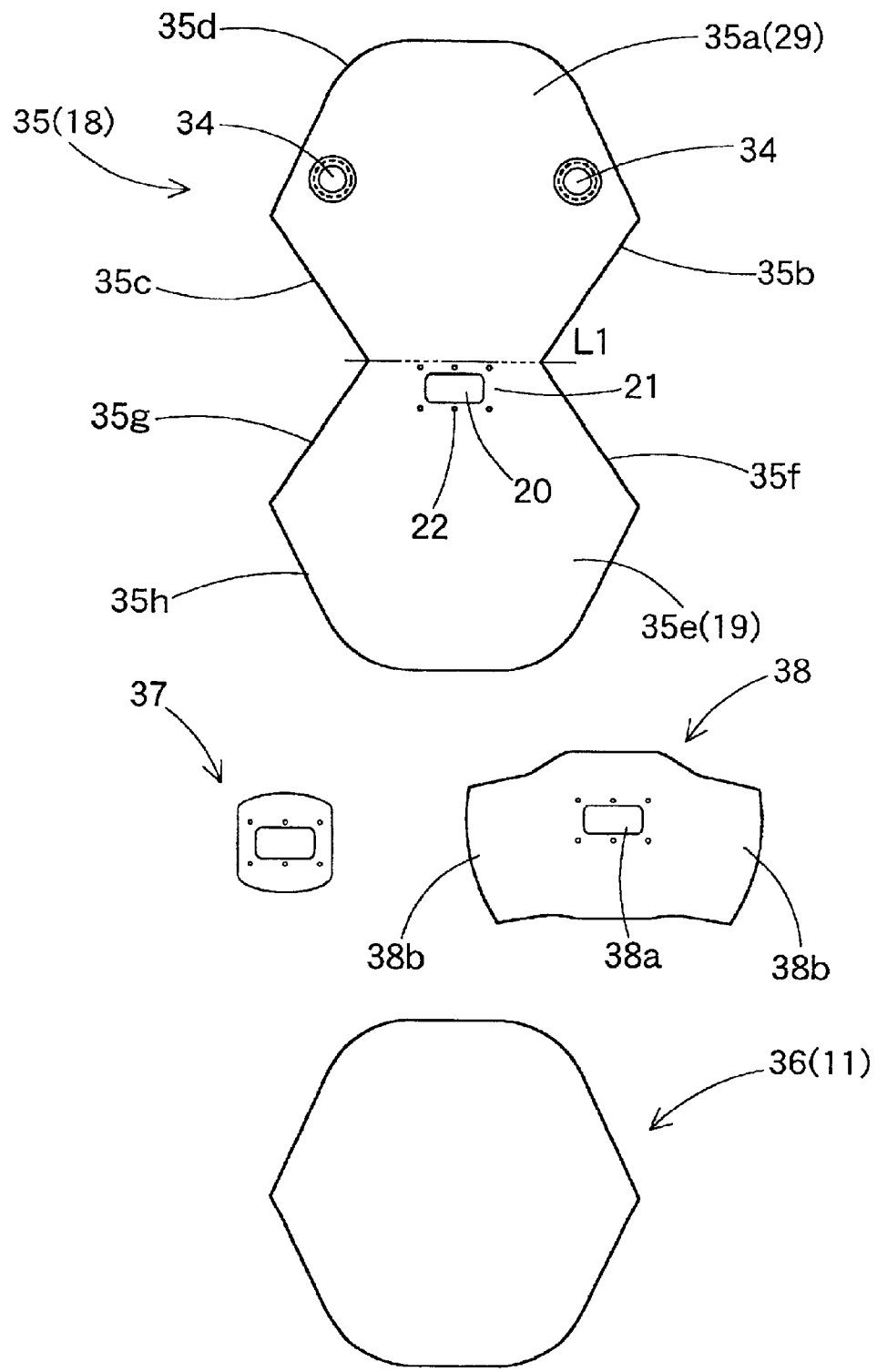
FIG. 5 is a top plan view showing a member to construct the airbag to be used in the same embodiment.
Figure 7:
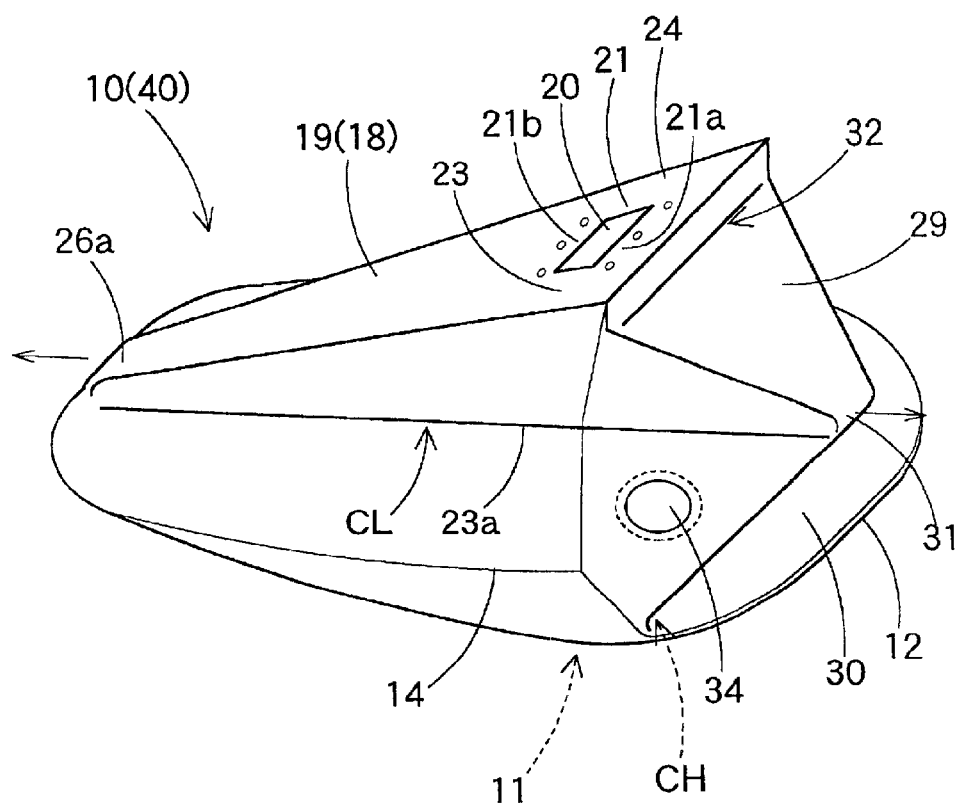
FIG. 7 is a perspective view showing folds for preliminarily folding the airbag to be used in the same embodiment.

Moreover, the airbag 10 is manufactured, as shown in FIGS. 5 and 6, by stitching first and second base cloths 35 and 36 of threads of polyester or polyamide. The first base cloth 35 is formed by jointing two cloths having a generally regular hexagonal shape (i.e., an upper side portion 35a and a lower side portion 35e). Specifically, the first base cloth 35 is formed into a guitar shape in which the two left and right edges near the center are recessed. The second base cloth 36 is formed generally into a circular shape similar to the generally regular hexagonal shape. These base cloths 35 and 36 are so set that they can be stitched into the stereoscopic airbag 10 by a planar stitching work.

Here, the second base cloth 36 forms substantially all the area of the passenger's side wall portion 11 of the airbag 10. On the other hand, the first base cloth 35 forms substantially all the area of the peripheral wall portion 18 of the airbag 10. Moreover, the upper side portion 35a of the first cloth 35 forms substantially all the area of the upper side peripheral wall 29, or the upper side of the peripheral wall portion 18. Moreover, the lower side portion 35e of the first base cloth 35 forms substantially all the area of the lower side peripheral wall 19, or the lower side of the peripheral wall portion 18.

The straightening cloth 39 is so formed that it can cover the gas inlet port 20 in the airbag 10, as shown in FIGS. 3 and 4. The straightening cloth 39 is shaped larger than the longitudinal and transverse sizes of the gas inlet port 20. Moreover, the straightening cloth 39 is formed into such an arcuate shape that its longitudinal sectional shape confronting the central portion of the gas inlet port 20 may be bulged upward away from the gas inlet port 20 as the airbag 10 is extended/inflated.

In the case of the embodiment, the straightening cloth 39 is made, before mounted on the airbag 10, of a straightening cloth material 38 made of threads of polyester or polyamide, as shown in FIG. 5. The cloth material 38 is made to have an opening 38a and band portions 38b and 38b. The opening 38a is formed to correspond to the gas inlet port 20. The band portions 38b and 38b are extended from the two sides of the opening 38a in the transverse direction of the vehicle. Moreover, these band portions 38b and 38b are stitched at their leading ends to form the straightening cloth 39. Here in the straightening cloth material 38, there are arranged the (not-shown) holes which correspond to the mounting holes 22.

Here will be described the manufacture of the airbag 10. First of all, as shown in FIG. 5 and FIG. 6A, the reinforcing cloth 37 and the straightening material 38 are stitched with a stitching thread S to the opening peripheral edge 21 of the gas inlet port 20 in the first base cloth 35 for the inner peripheral face of the airbag 10. Next, as shown in FIG. 6B, the band portions 38b of the straightening cloth material 38 are stitched in an arcuate shape by using the stitching thread S thereby to form the straightening cloth 39 into a predetermined shape.

After this, the first base cloth 35 is folded back on a first reference line L1 on the two left and right edges of the first base cloth 35 near the gas inlet port 20. The first reference line L1 is positioned to extend leftward and rightward between the upper side portion 35a and the lower side portion 35e as shown FIGS. 6B and 6C. Next, the stitching thread S is used to stitch straight side edge portions 35b and 35f to each other at the upper/lower side portions 35a and 35e of the reference line L1. Simultaneously with this, the stitching thread S is used to stitch other straight side edge portions 35c and 35g to each other at the upper/lower side portions 35a and 35e.

Next, as shown in FIGS. 6C and 6D, the upper side portion 35a is folded on a second reference line L2, and the unstitched peripheral edges 35d and 35h of the upper/lower side portions 35a and 35e are widened apart from each other. The second reference line L2 is so positioned as to extend rightward and leftward of the rightward and leftward bulging positions of the upper side portion 35a. The widened contour of the remaining peripheral edges 35d and 35h is similar to that of the second base cloth 36.

Moreover, the second base cloths 36 are overlaid, and the overlaid outer peripheral edges are stitched to each other, as shown in FIGS. 6D and 6E, by using the stitching thread S. Thus, the airbag 10 can be formed into a bag shape.

Moreover, the airbag 10 is so turned inside out by using the gas inlet port 20 that the stitched margins of the individual portions may not be exposed to the outer peripheral face of the airbag 10.

Where the turning work by using the gas inlet port 20 is difficult, the stitching work of the band portion 38b of the straightening cloth material 38 may be done after the airbag 10 was turned inside out. After the airbag 10 was turned inside out, more specifically, the band portions 38b of the straightening cloth material 38 are extracted from the gas inlet port 20 and stitched at their end portions to each other.

Here will be described how to mount the airbag 10 thus manufactured on the vehicle. First of all, the airbag 10 having the retainer 51 arranged therein is folded up. At this time, the individual bolts 51a of the retainer 51 are protruded from the individual mounting holes 22. Moreover, the airbag 10 folded up is so wrapped by the not-shown rupturable wrapping sheet that it may not be folded down.

Moreover, this folding-up process of the airbag 10 proceeds from a preliminarily folding step to a horizontal folding step and a vertical folding step.

Figure 8:
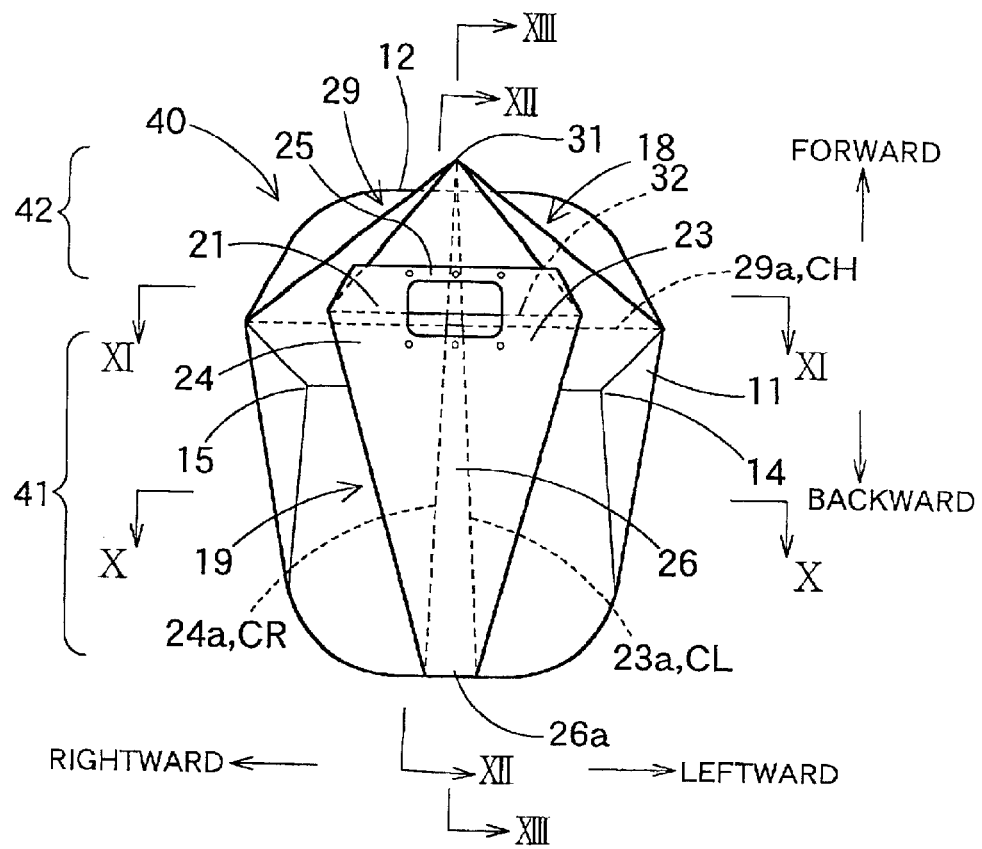
FIG. 8 is a view showing after the airbag to be used in the same embodiment was preliminarily folded, and taken from the side of a gas inlet port.
Figure 9:
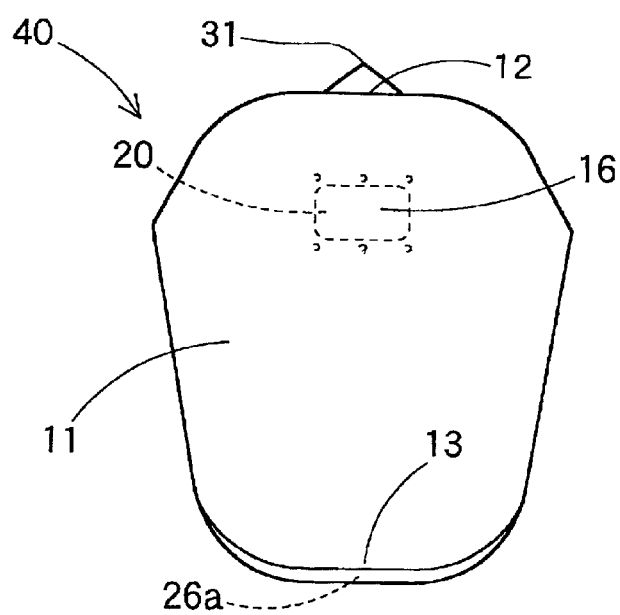
FIG. 9 is a view showing after the airbag to be used in the same embodiment was preliminarily folded, and taken from the side of a passenger's side wall portion.
Figure 10:
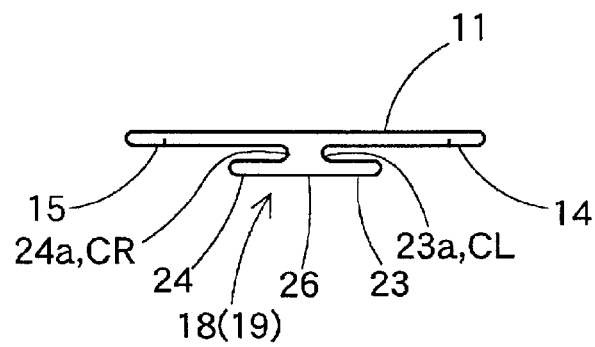
FIG. 10 is an end face view taken line X—X of FIG. 8.
Figure 11:
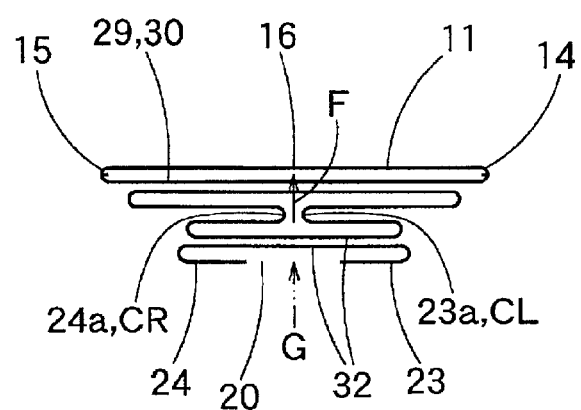
FIG. 11 is an end face view taken line XI—XI of FIG. 8.

At the preliminarily folding step, a preliminarily folded airbag 40 is formed, as shown in FIGS. 8 and 9. In this preliminary folding, the passenger's side wall portion 11 is flattened over the lower side peripheral wall 19 of the peripheral wall portion 18. At this time, a near portion 16 of the upper edge 12 in the peripheral side wall portion 11 is so arranged over the gas inlet port 20 as to confront the gas inlet port 20 (as referred to FIG. 13). In the case of the embodiment, moreover, the peripheral wall portion 18 side is folded up. As a result, substantially all the area of the passenger's side wall portion 11 excepting the portions near the left edge 14 and the right edge 15 of the passenger's side wall portion 11 is so preliminarily folded that it may be flatly extended.

The preliminary folding of the peripheral wall portion 18 is done in the case of the embodiment, as shown in FIGS. 7 to 13. A portion 23 of the peripheral wall portion 18 on the left side of the gas inlet port 20 is folded in a valley on a crease CL. A portion 24 of the peripheral wall portion 18 on the right side of the gas inlet port 20 is folded in a valley on a crease CR. A portion 30 of the peripheral wall portion 18 near the portion jointed to the passenger's side wall portion upper edge 12 is folded in a valley on a crease CH. In the folding of the left side portion 23 of the gas inlet port 20, more specifically, a substantially intermediate portion 23a to the left edge 14 of the passenger's side wall portion 11, as flatly extended, is brought to the gas inlet port 20. And, the substantially intermediate portion 23a is arranged on the passenger's side wall portion 11 side of the gas inlet port peripheral edge 21. At this time, the left side portion 23 is folded in the valley on the crease CL in the longitudinal direction. In the folding of the right side portion 24 of the gas inlet port 20, on the other hand, a substantially intermediate portion 24a to the right edge 15 of the passenger's side wall portion 11, as flatly extended, is brought to the gas inlet port 20. And, the substantially intermediate portion 24a is arranged on the passenger's side wall portion 11 side of the gas inlet port peripheral edge 21. At this time, the right side portion 24 is folded in the valley on the crease CR in the longitudinal direction. Here, the left side portion 23 and the right side portion 24 of the gas inlet port 20 are folded up by bringing the creases CL and CR to each other.

On the other hand, the folding of the near portion 30 of the peripheral wall portion 18 on the side of the upper edge 12 is done by bringing a substantially intermediate portion 29a of an upper side peripheral wall 29 from a protruding crest 31 to the passenger's side wall portion upper edge 12. At this time, the intermediate portion 29a is arranged on the passenger's side wall portion 11 side of the gas inlet port peripheral edge 21. The protruding crest 31 is located at the front end side of the creases CL and CR in the upper side peripheral wall 29. Moreover, the upper edge near portion 30 is folded in the valley on the crease CH in the transverse direction. This crease CH is arranged on the front side of the rear edge 12b of the gas inlet port 20, as shown in FIGS. 12 and 13.

This preliminary folding can be done by gripping and pulling the predetermined portions 31 and 26a of the airbag 10. This gripped portion 31 is a substantially intermediate portion (or the protruding crest 31) in the peripheral wall portion 18 between the transverse center portion on the front edge 21a side of the gas inlet port 20 and the transverse central portion in the passenger's side wall portion upper edge 12. Moreover, the gripped portions 31 and 26a are pulled apart from each other in the longitudinal direction. On the other hand, the gripped portion 26a is located at the transversely central portion of a rear side portion 26 of the gas inlet port 20 in the peripheral wall portion 18. This gripped portion 26a of the rear side portion 26 is desirably positioned as close to the lower edge 13 of the passenger's side wall portion 11 as possible. This desire is intended to make it to extend substantially all the area of the passenger's side wall portion 11 to be flatly extended at the preliminarily folding time.

Here in the embodiment, a portion 32 of the peripheral wall portion 18 from the front side portion 25 of the gas inlet port 20 to the protruding crest 31 is so folded in a valley as to come close to the gas inlet port 20. This folding is intended to flatten the opening peripheral edge 21 of the gas inlet port 20 in parallel with the passenger's side wall portion 11.

Figure 12:
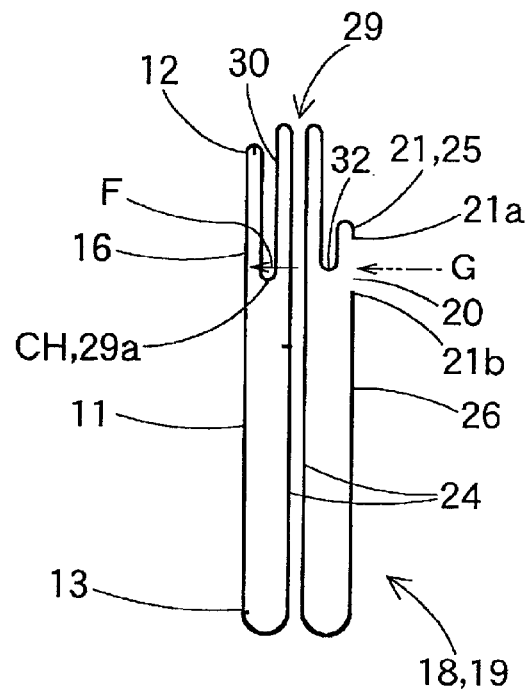
FIG. 12 is an end face view taken line XII—XII of FIG. 8.
Figure 13:
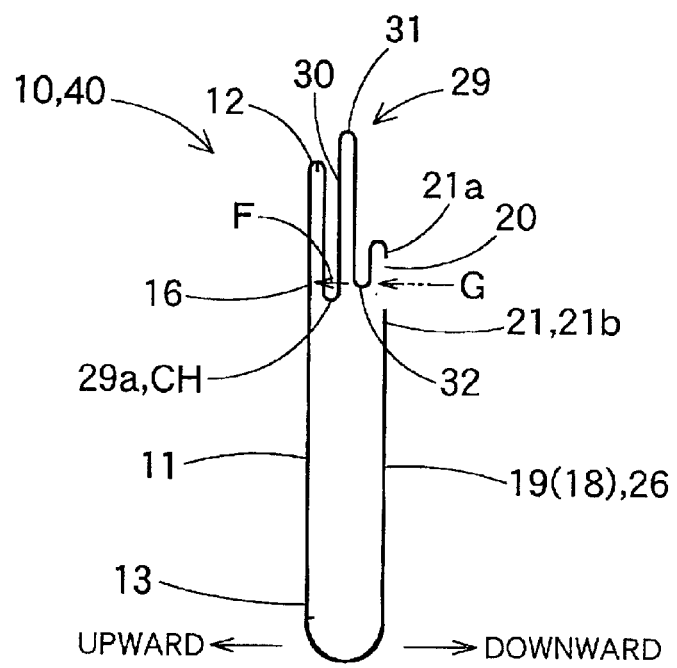
FIG. 13 is an end face view taken line XIII—XIII of FIG. 8.
Figure 14A:
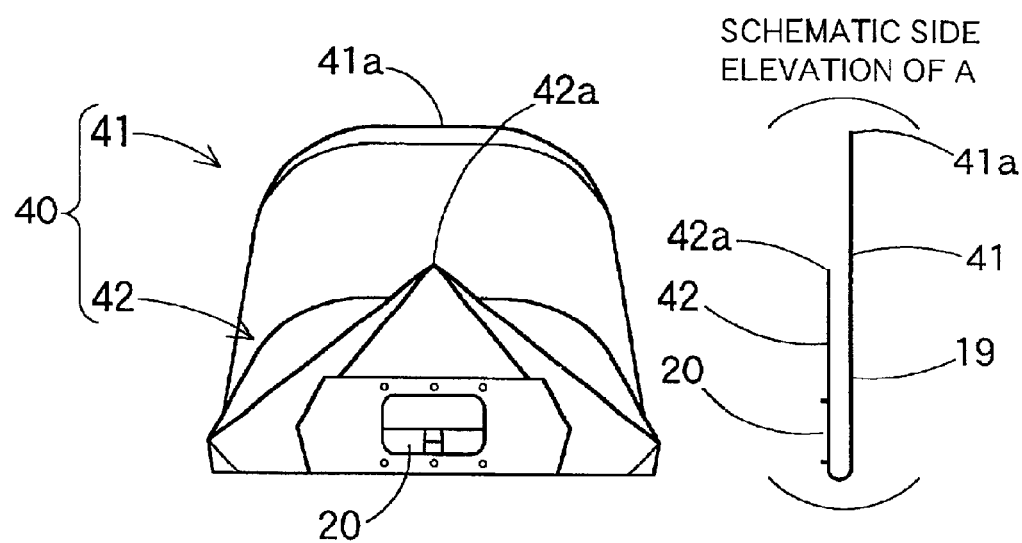
FIGS. 14A and 14B are views showing folding-up steps after the airbag to be used in the same embodiment was preliminarily folded.
Figure 14B:
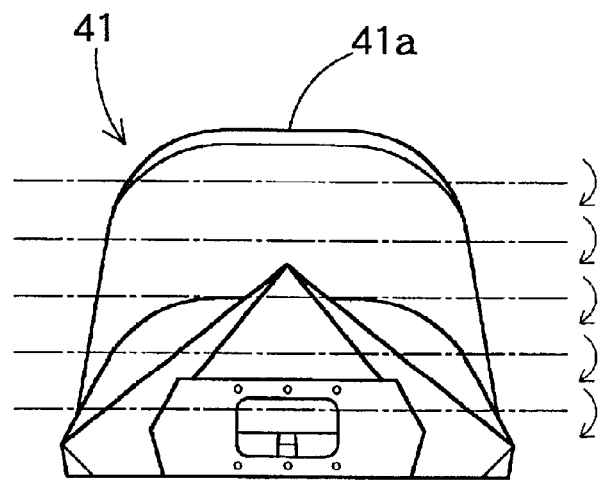

In the preliminarily folded airbag 40 of the embodiment, moreover, the valley crease CH-32 in the upper side peripheral wall 29 is arranged in front of the rear edge 21b of the gas inlet port 20, as shown in FIGS. 12 and 13. This upper side peripheral wall 29 is located in the peripheral wall portion 18 on the upper side of the gas inlet port 20. In other words, in the preliminarily folded airbag 40, the upper side peripheral wall 29 is folded up and arranged in the range on the front side of the rear edge 21b of the gas inlet port 20.

After the preliminary folding was thus done, moreover, the horizontal folding is done, as shown in FIG. 8, FIGS. 14A and 14B and FIGS. 15A and 15B. A portion 41 of the preliminarily folded airbag 40 on the back side of the gas inlet port 20 is so folded up on a crease in the transverse direction as to bring an end portion 41a close to the gas inlet port 20. Likewise, a portion 42 of the preliminarily folded airbag 40 on the front side of the gas inlet port 20 is so folded up on a crease in the transverse direction as to bring an end portion 42a close to the gas inlet port 20. In the case of the embodiment, the back side portion 41 is so folded that its back end 41a is rolled toward the lower side peripheral wall 19 and placed over the passenger's side wall portion 11. On the other hand, the front side portion 42 is folded into a bellows.

Figure 15A:
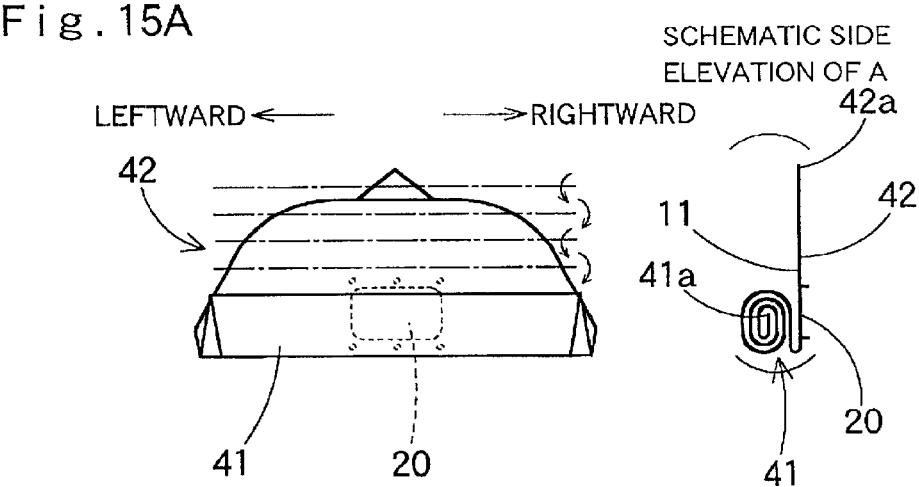
FIGS. 15A to 15C are views showing the folding-up steps of the airbag to be used in the same embodiment, and show the steps after those of FIGS. 14A and 14B.
Figure 15B:
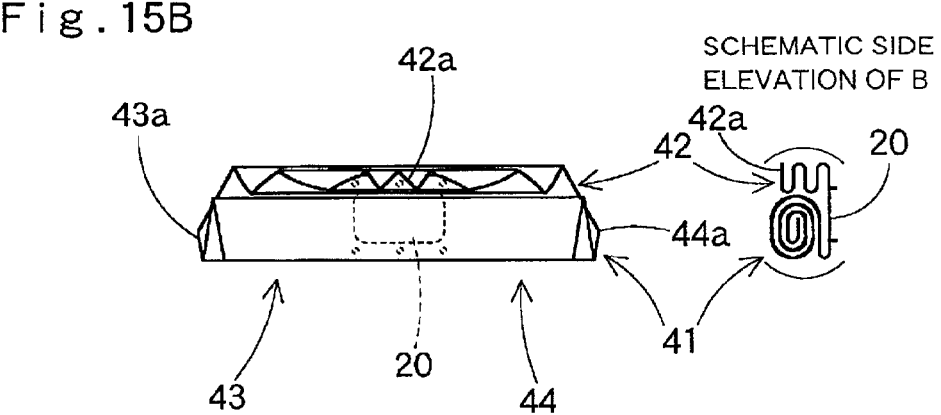
Figure 15C:
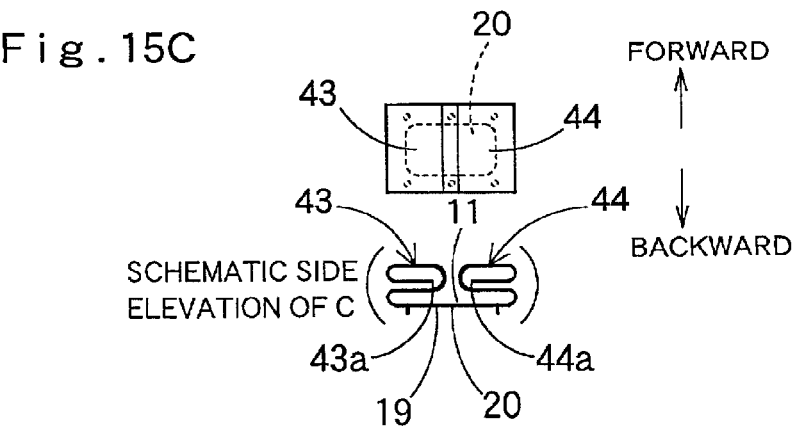

After this horizontal folding, portions 43 and 44 of the airbag 10 on the left and right sides of the gas inlet port 20 are vertically folded. The left side portion 43 is so folded up on a crease in the longitudinal direction that its end portion 43a is brought close to the gas inlet port 20, as shown in FIGS. 15B and 15C. Likewise, the right side portion 44 is so folded up on a crease in the longitudinal direction that its end portion 44a is brought close to the gas inlet port 20. In the case of the embodiment, the left and right side portions 43 and 44 are folded into such a bellows that their end portions 43a and 44a are folded back toward the lower side peripheral wall 19 and then placed over the side of the passenger's sidewall portion 11.

After the folding of the airbag 10 was completed through the vertical folding step, the folded-up airbag 10 is wrapped with the not-shown rupturable wrapping sheet, as has been described hereinbefore. This wrapping sheet is so arranged that the folded-up airbag 10 may not be folded down.

Then, the inflator 54 is housed in the lower chamber 61 of the case 56. Next, the folded-up airbag 10 is housed in the upper chamber 57 of the case 56. At this time, the individual bolts 51a of the retainer 51 are protruded from the individual bottom wall portions 59 of the case 56. Moreover, the side wall portion 71 of the airbag cover 67 is mounted on the upper chamber 57. At this time, the retaining protrusions 58a of the peripheral wall portion 58 are inserted into the individual retaining holes 71a of the side wall portion 71.

Next, the upper ends of the individual vertical plate portions 65b are introduced along the retaining protrusions 58a protruding from the side wall portion 71. At the same time, the bolts 51a are inserted into the individual horizontal plate portions 65a to arrange the holding plates 65 and 65 in front and at the back of the case 56. When the nuts 51b are fastened into the individual bolts 51a, moreover, it is possible to assemble the airbag device M.

Then, the passenger's seat airbag device M thus assembled is inserted from the opening 2 of the in-pane 1 assembled in the vehicle. Then, the individual retaining legs 68a are retained on the flange portion 3. At the same time, the bolts 6 are fastened through the bracket 5b in the nuts 63a to joint the case 56 to the body 5. Thus, the passenger's seat airbag device M can be mounted on the vehicle.

If the inflating gas G is discharged from the inflator 54 after the airbag device M was mounted on the vehicle, the airbag 10 is inflated to rupture the not-shown wrapping sheet. Then, the airbag 10 ruptures the rupturable portion 70 of the airbag cover 67 to open the door portions 69 and 69, as indicated by the double-dotted lines in FIGS. 2 and 16. As a result, the airbag 10 is largely protruded from the case upper chamber 57. Here, reference letter W in FIG. 16 designates a windshield.

In the airbag device M of the embodiment being extended/inflated, the airbag 10 is extended/inflated while admitting the inflating gas G from the gas inlet port 20 to eliminate the horizontal and vertical creases.

In the airbag 10 of the embodiment at the preliminarily folding time, the upper edge near portion 16 of the passenger's side wall portion 11 is arranged at the upper portion of the gas inlet port 20 to confront the gas inlet port 20. Therefore, the upper edge near portion 16 is forcibly pushed upward prior to the remaining portions on the lower edge 13 side of the passenger's side wall portion 12 by the pushing force F (as referred to FIGS. 11 to 13) of the inflating gas G at the initial stage of the inflow. As a result, the passenger's side wall portion 11 can be easily arranged generally in the vertical direction. Here in the case of the embodiment, the pushing force F of the inflating gas G acts on the straightening cloth 39, the valley crease 32 of the peripheral wall portion 18, and the upper edge near portion 30 (or the intermediate portion 29a) of the peripheral wall portion 18. Moreover, the pushing force F acts on the upper edge near portion 16 of the passenger's side wall portion 11 through the peripheral wall portion 18 near the left and right intermediate portions 23a and 24a.

If the upper edge near portion 16 of the passenger's side wall portion 11 is forcibly pushed up, moreover, this push can eliminate the horizontal and vertical creases quickly. Therefore, the passenger's side wall portion 11 can be widely extended.

In the passenger's seat airbag device M of the embodiment, therefore, at the extended/inflated time of the airbag 10, the passenger's side wall portion 11 to take a position generally perpendicular to the gas inlet port peripheral edge 21 can be quickly arranged generally in the vertical direction. Moreover, the airbag 10 can be so extended in a wide open state as to apply no partial pressing force to the passenger side.

In the embodiment, moreover, at the preliminarily folding time of the airbag 10, substantially all the area of the passenger's side wall portion 11 is flatly extended so that the peripheral wall portion 18 is folded up but the passenger's side wall portion 11 is not. Therefore, the preliminarily folding work of the airbag 10 can be conveniently done. In the embodiment, moreover, substantially all the area of the passenger's side wall portion 11 is flatly extended at the preliminarily folding time of the airbag 10. As compared with the case in which the passenger's side wall portion 11 is folded up, therefore, the passenger's side wall portion 11 can easily move toward the passenger while being extended widely vertically and transversely when the airbag 10 is extended/inflated. As a result, it is possible to further suppress the moving velocity of the passenger's side wall portion 11 toward the passenger.

In the embodiment, moreover, the upper side peripheral wall 29 in the peripheral wall portion 18 is folded up within the range on the front side of the rear edge 21b of the gas inlet port 20. In other words, the upper side peripheral wall 29 is not so folded up as to extend largely to the rear side of the gas inlet port 20. If the inflating gas G flows in from the gas inlet port 20, moreover, the upper edge near portion 16 of the passenger's side wall portion 11 is pushed up through the upper side peripheral wall 29. At this time, the upper side peripheral wall 29 itself is also pushed up. Moreover, the upper side peripheral wall 29 is unfolded to leave the gas inlet port 20 as it is pushed up. Therefore, the upper edge near portion 16 of the passenger's side wall portion 11 comes into the state in which it confronts the gas inlet port 20 directly. As a result, the passenger's side wall portion 11 can be easily arranged generally in the vertical direction.

In the embodiment, moreover, at the preliminarily folding time of the peripheral wall portion 18 of the airbag 10, the left side portion 23 of the gas inlet port 20 is so folded that the substantially intermediate portion 23a to the left edge 14 of the passenger's side wall portion 11 flatly extended may be brought close to the gas inlet port 20 and arranged on the passenger's side wall portion 11 side of the gas inlet port peripheral edge 21. In other words, the left side portion 23 is folded in with the valley crease CL in the longitudinal direction. Moreover, the right side portion 24 of the gas inlet port 20 is so folded that the substantially intermediate portion 24a to the right edge 15 of the passenger's side wall portion 11 flatly extended may be brought close to the gas inlet port 20 and arranged on the passenger's side wall portion 11 side of the gas inlet port peripheral edge 21. In other words, the right side portion 24 is folded in with the valley crease CR in the longitudinal direction. Moreover, the portion 30 of the peripheral wall portion 18 near the joint to the upper edge 12 of the passenger's side wall portion 11 is folded in with the valley crease CH in the transverse direction. In short, in the embodiment, the peripheral wall portion 18 of the airbag 10 is folded up transversely symmetrically with respect to the gas inlet port 20 so that the preliminarily folding work can be facilitated.

Especially, this preliminarily folded shape of the peripheral wall portion 18 can be smoothly made by gripping the predetermined portions 31 and 26a of the airbag 10 and pulling them in the longitudinal direction to separate them. The gripped portion 31 is at the substantially intermediate portion between the transverse center of the peripheral wall portion 18 on the front edge 21a side of the gas inlet port 20 and the transverse center of the passenger's side wall portion upper edge 12. Moreover, the gripped portion 26a is located near the transverse center of the peripheral wall portion 18 on the back side of the gas inlet port 20. As a result, in the embodiment, the preliminarily folding work of the airbag 10 can be made more convenient.

In the embodiment, moreover, the substantially intermediate portion (or the valley-folded portion) having the valley crease CH of the upper side peripheral wall 29 is arranged on the front side of the rear edge 21b of the gas inlet port 20. Therefore, the gas inlet port 20 can easily confront the upper edge near portion 16 of the passenger's side wall portion 11. In other words, in the embodiment, the pushing force F of the inflating gas G for pushing up the upper edge near portion 16 of the passenger's side wall portion 11 can be enhanced by applying it directly to the upper edge near portion 16. As a result, the passenger's side wall portion 11 can be more easily arranged in the vertical direction.

Here in the embodiment, the portion (or the valley-folded portion) 32 of the peripheral wall portion 18 from the front side portion 25 of the gas inlet port 20 to the protruding crest 31 is so arranged on the back side of the front edge 21a of the gas inlet port 20 as to confront the gas inlet port 20. However, this valley-folded portion 32 is arranged close to the gas inlet port 20 but exerts no influence upon the pushing force F of the inflating gas G to push up the upper edge near portion 16 of the passenger's side wall portion 11.

In connection with the preliminary folding of the peripheral wall portion 18, moreover, an airbag 10A may be preliminarily folded to form a preliminarily folded airbag 40A, as shown in FIGS. 17 to 20. The airbag 10A is formed like the airbag 10 of the embodiment to have the same shape as that of the airbag 10 by using the first and second base cloths 35 and 36 and the straightening cloth material 38.

In the preliminarily folded airbag 40A of the airbag 10A, the preliminary folding is done to protrude the protruded crest 31 to the front side. This preliminary folding is done like that of the aforementioned airbag 10 by gripping and pulling the predetermined portions 31 and 26a of the airbag 10A while substantially all the rear of the passenger's side wall portion 11 being flatly extended. The gripped portion 31 is a substantially intermediate portion in the peripheral wall portion 18 between the transverse center portion on the front edge 21a side of the gas inlet port 20 and the transverse central portion in the passenger's side wall portion upper edge 12. The gripped portion 26a is located at the transversely central portion in the peripheral wall portion 18 on the back side of the gas inlet port 20. Moreover, the gripped portions 31 and 26a are gripped and pulled in the longitudinal direction to separate themselves from each other. At this time, in the airbag 10A, the gripped portion 31 is largely pulled. This preliminarily folded airbag 40A is made slightly smaller in the transverse width size than that of the preliminarily folded airbag 40 because the protruded crest 31 is protruded to the front side.

Figure 19:
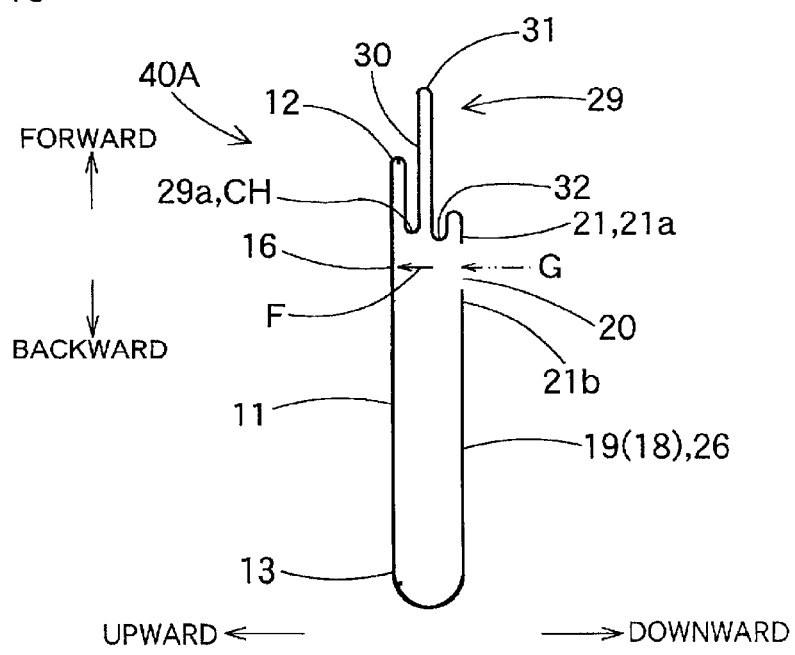
FIG. 19 is an end face view taken along line XIX—XIX of FIG. 17.
Figure 20:
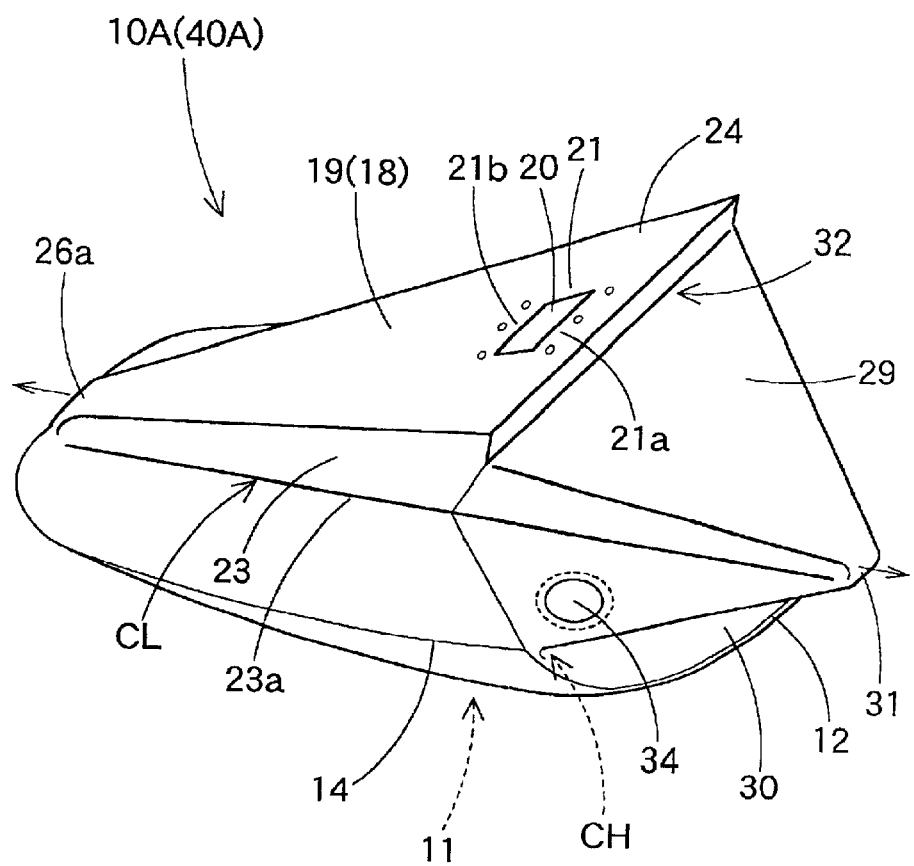
FIG. 20 is a perspective view showing the folds when the preliminarily folded airbag shown in FIG. 17 is preliminarily folded.

In the preliminarily folded airbag 40A, moreover, the valley crease CH in the peripheral wall portion 18 is arranged on the front side of the front edge 21a of the gas inlet port 20 as shown in FIG. 19. This crease CH extends in the transverse direction at the portion 30 near the passenger's side wall upper edge 12.

Moreover, this preliminarily folded airbag 40A is folded up horizontally and vertically like the preliminarily folded airbag 40, as shown in FIGS. 21A, 21B, 21C and 21D. At first, the portion 41 of the preliminarily folded airbag 40A on the back of the gas inlet port 20 is transversely folded and is rolled to bring the end portion 41a close to the gas inlet port 20. Next, the front side portion 42 of the gas inlet port 20 is transversely folded into such a bellows as to bring the end portion 42a close to the gas inlet port 20. After this, the portions 43 and 44 on the left and right sides of the gas inlet port 20 are longitudinally folded in the vertical direction to bring the end portions 43a and 44a close to the gas inlet port 20.

After the airbag 10A was folded up, moreover, it is assembled like the airbag 10 with the airbag device M and is mounted on the vehicle.

This airbag 10A can attain actions similar to those of the foregoing airbag 10 when it is extended/inflated. In the airbag 10A, moreover, the substantially intermediate portion (or the valley-folded portion) 29a having the valley crease CH in the upper side wall portion 29 is arranged in the preliminarily folded airbag 40A on the front side of the front edge 21a of the gas inlet port 20. In other words, the valley crease CH is not arranged at the position to confront the gas inlet port 20. Therefore, the gas inlet port 20 easily confronts the upper edge near portion 16 of the passenger's side wall portion 11 more directly. In this preliminarily folded airbag 40A, too, the pushing force F of the inflating gas G acts, in fact, upon the upper edge near portion 16 of the passenger's side wall portion 11 through the left and right intermediate portions 23a and 24a of the straightening cloth 39 and the peripheral wall portion 18.

In connection with the preliminary folding of the peripheral wall portion 18, moreover, an airbag 10B may be preliminarily folded to form a preliminarily folded airbag 40B, as shown in FIGS. 22 to 27. Like the airbag 10 of the embodiment, the airbag 10B is formed into the same shape as that of the airbag 10 by using the first and second base cloths 35 and 36 and the straightening cloth material 38.

The preliminarily folded airbag 40B is so preliminarily folded from the airbag 10B that its portion on the back side of the gas inlet port 20 is largely protruded to the back side with the rear side portion 26 of the peripheral wall portion 18 and the rear edge 13 of the passenger's side wall portion 11. Moreover, the preliminarily folded airbag 40B is preliminarily folded that the passenger's side wall portion 11 is arranged on the back side of the gas inlet port 20. This preliminary folding is done by gripping and pulling the predetermined portions 31 and 13a of the airbag 10B while substantially all the area of the passenger's side wall portion 11 being flatly extended. The gripped portion 31 is located at the peripheral wall portion 18 between the transversely central portion of the front edge 21a side of the gas inlet port 20 and the transversely central portion of the passenger's side wall portion upper edge 12. The gripped portion 13a is located at the transversely central portion of the lower edge 13 of the passenger's side base portion 11. On the other hand, this gripped portion 13a is located at the portion of the aforementioned airbag 10 or 10A on the back side of the gripped portion 26a. Moreover, the passenger's side wall portion 11 is moved backward, and the gripped portions 31 and 13a are gripped and pulled in the longitudinal direction away from each other. In the airbag 10B, the gripped portion 13a is then largely pulled. In this preliminarily folded airbag 40B, the gripped portion 13a is largely protruded to the back side so that its longitudinal size of the back side portion 42 is made larger than that of the preliminarily folded airbag 40.

In this preliminarily folded airbag 40B, moreover, the portion to be arranged at the position to confront the gas inlet port 20 is made of a portion 29b of the peripheral wall portion 18 near the upper edge 12 of the passenger's side wall portion 11, and the upper edge 12 of the passenger's side wall portion 11 is arranged on the back side of the rear edge 21b of the gas inlet port 20.

On the other hand, this preliminarily folded airbag 40B is folded up horizontally and vertically, as shown in FIGS. 28A, 28B, 28C and 28D. First of all, the portion 41 of the preliminarily folded airbag 40B on the back side of the gas inlet port 20 is folded to form transverse creases and is rolled to bring the end portion 41a close to the gas inlet port 20. Next, the portion 42 on the front side of the gas inlet port 20 is folded to form transverse creases and is folded back to bring the end portion 42a close to the gas inlet port 20. After this, the left side portion 43 and the right side portion 44 of the gas inlet port 20 are folded to form longitudinal creases and is vertically folded to bring the end portions 43a and 44a close to the gas inlet port 20.

Figure 29:
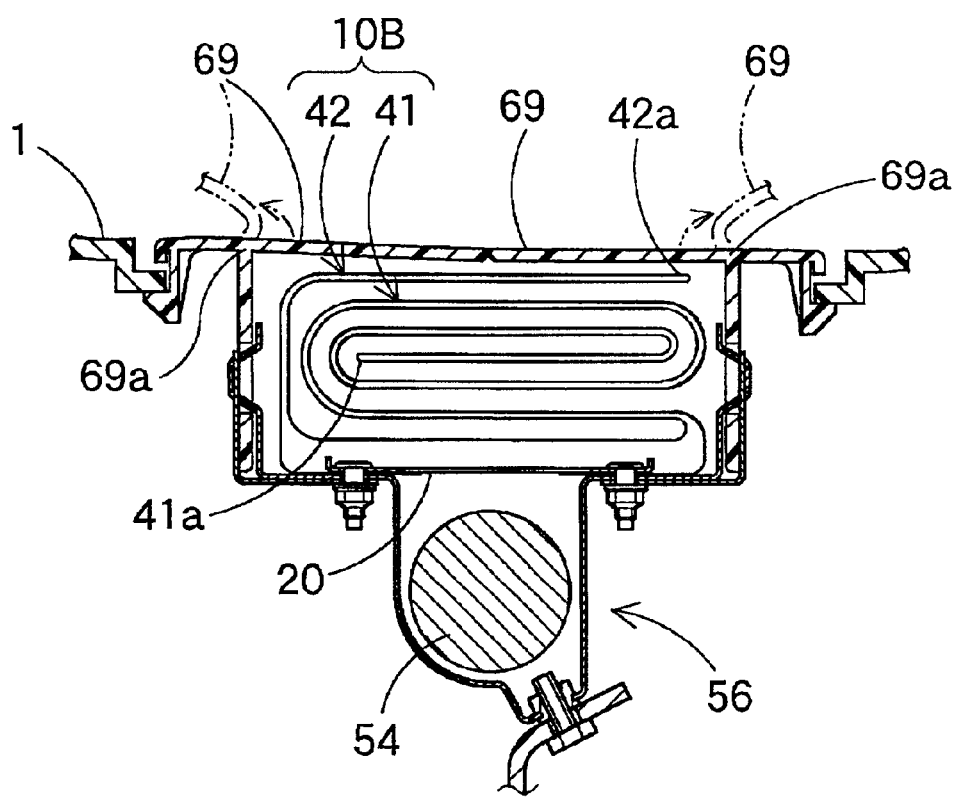
FIG. 29 is a view showing a horizontal folding of the airbag shown in FIG. 22.

The folded-up airbag 10B is assembled like the airbag 10 or 10A in the airbag device M, as shown in FIG. 29, and is mounted on the vehicle.

Figure 30:
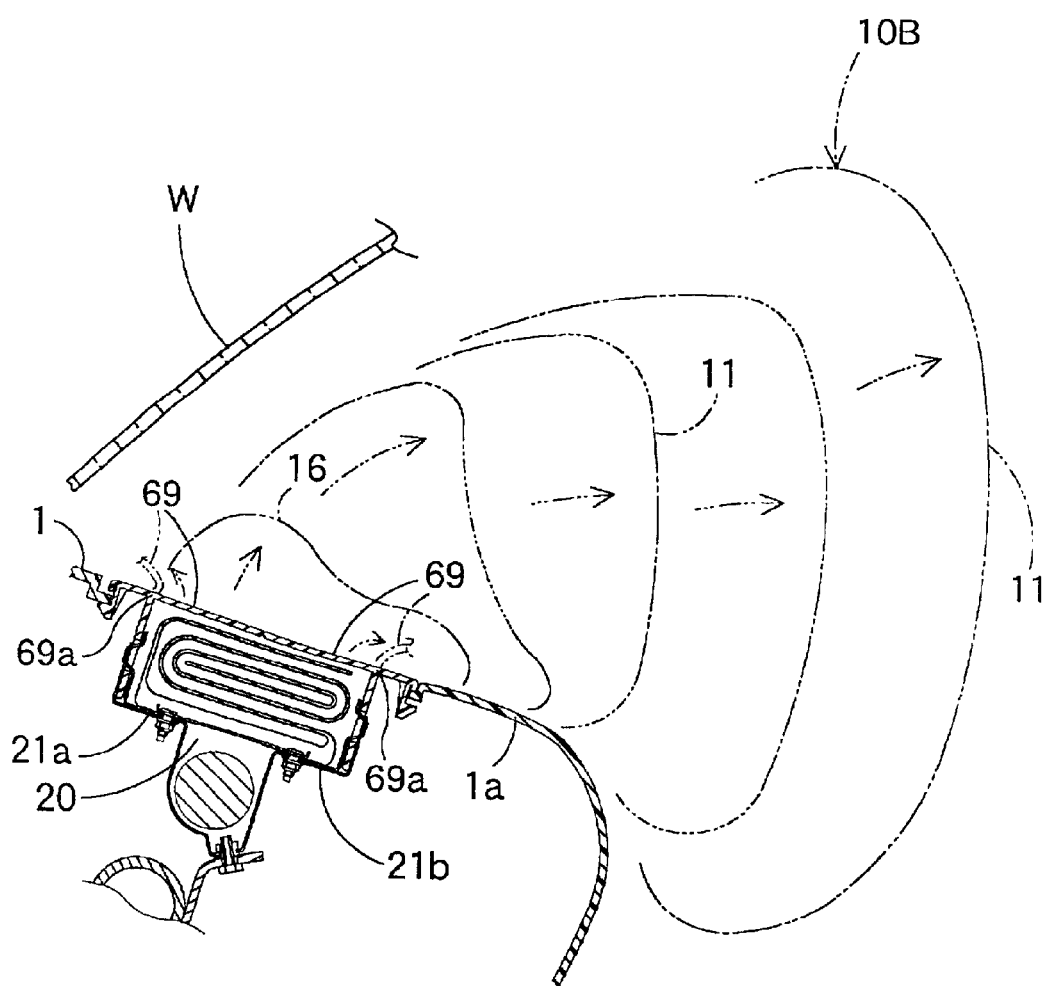
FIG. 30 is a view showing the state in which the airbag shown in FIG. 22 is extended/inflated.
Figure 31:
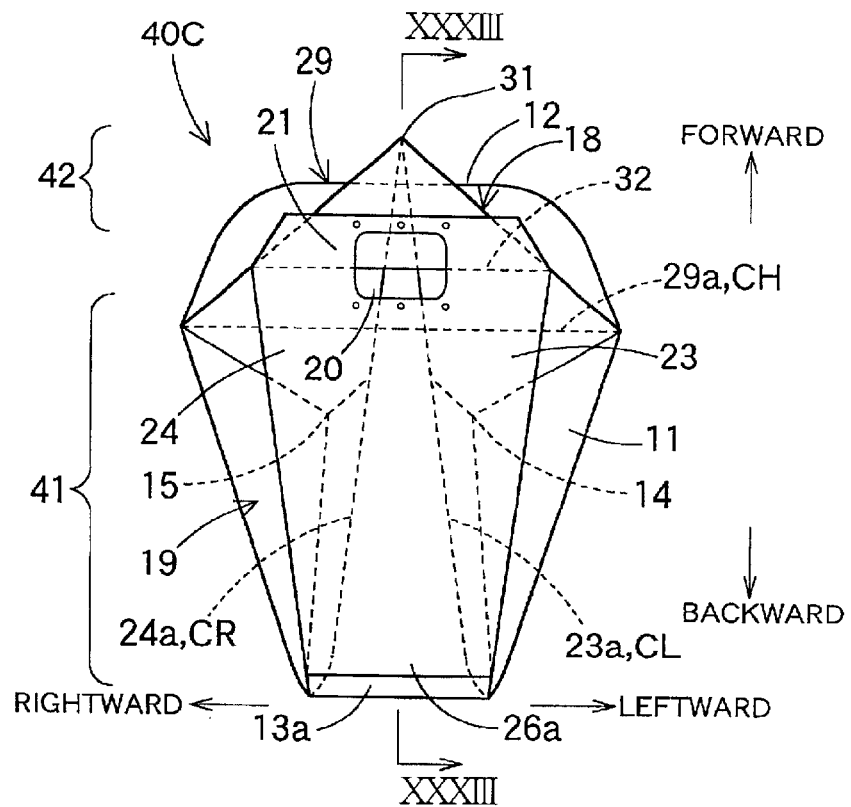
FIG. 31 is a view showing an airbag of still another embodiment, after preliminarily folded, and is taken from the side of the gas inlet port.
Figure 32:
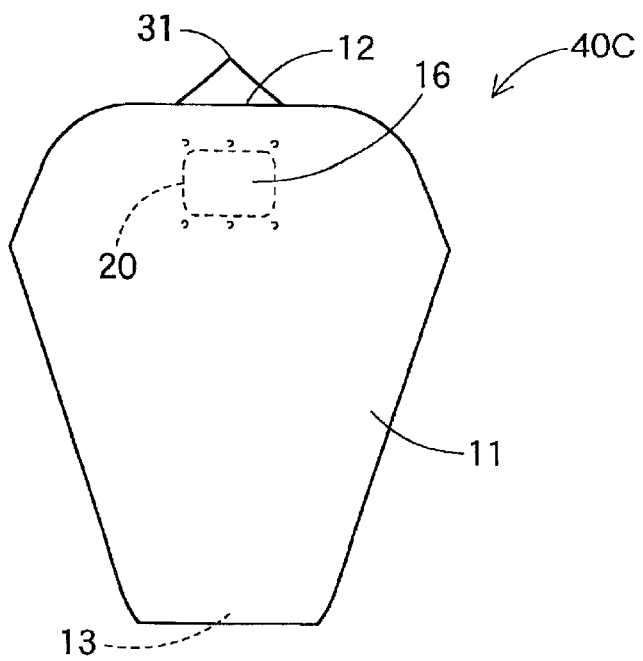
FIG. 32 is a view showing the preliminarily folded airbag shown in FIG. 31 and is taken from the side of the passenger's side wall portion.
Figure 33:
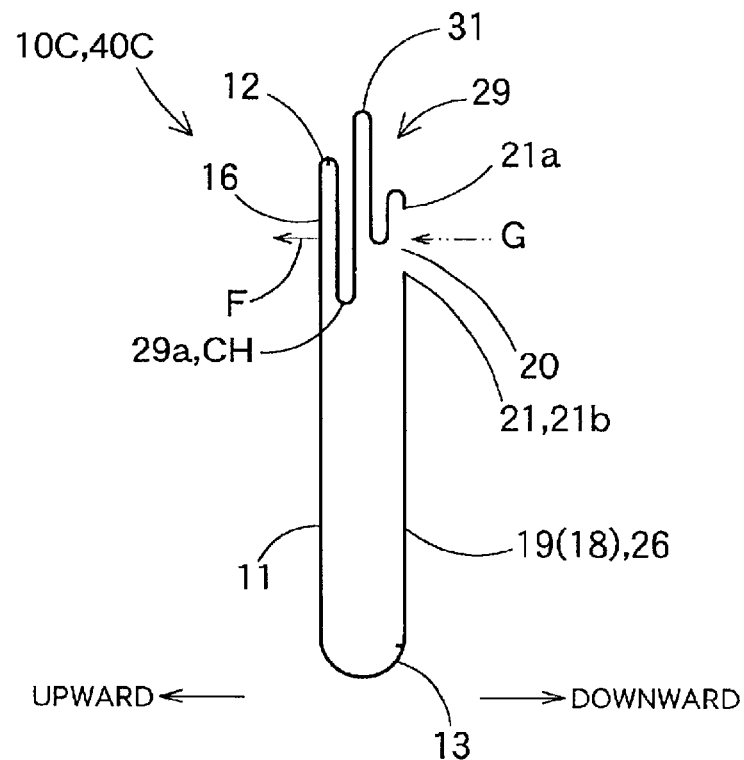
FIG. 33 is an end face view taken along line XXXIII—XXXIII of FIG. 31.
Figure 34:
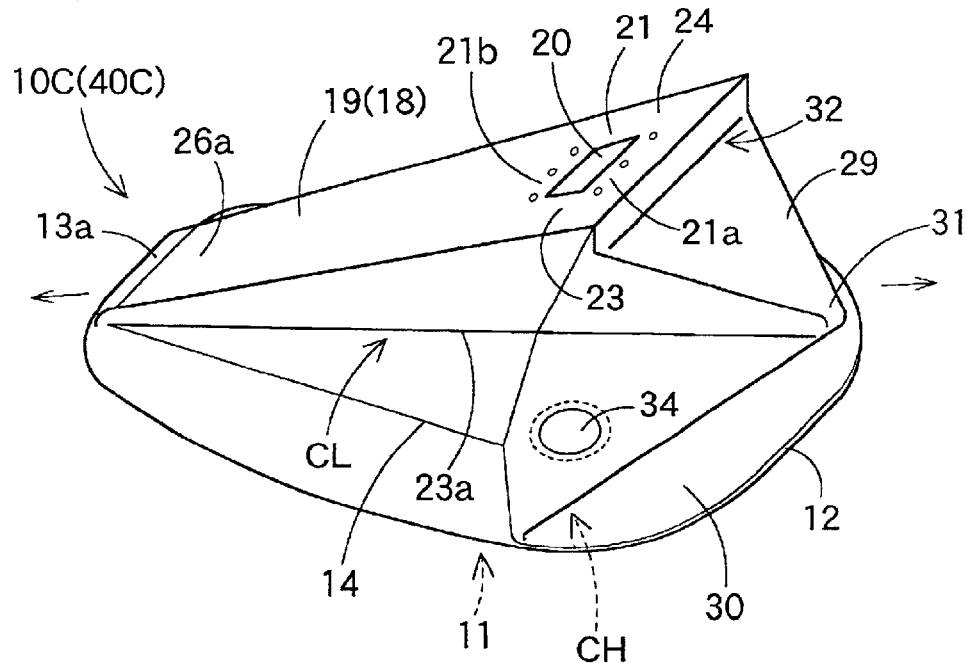
FIG. 34 is a perspective view showing the folds when the preliminarily folded airbag shown in FIG. 31 is preliminarily folded.
Figure 35A:
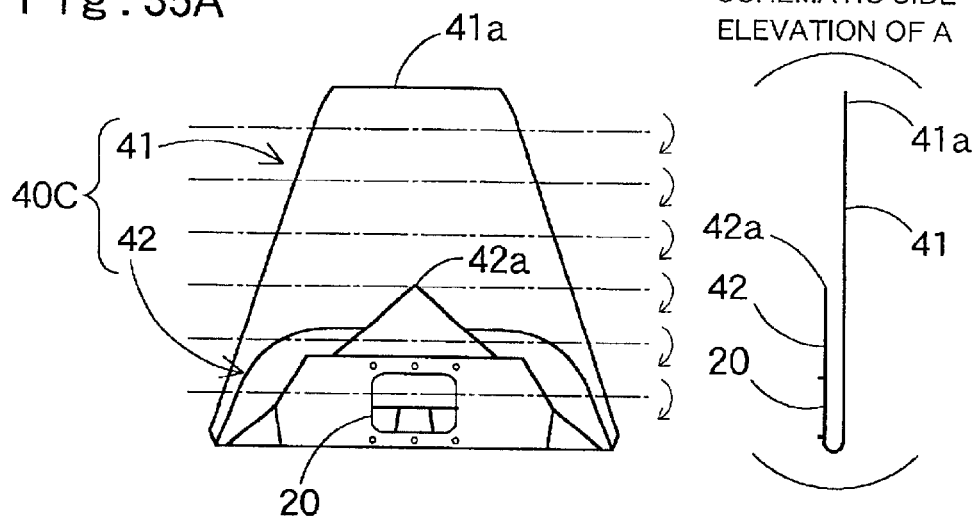
FIGS. 35A to 35D are views showing the folding-up steps after the airbag shown in FIG. 31 was preliminarily folded.
Figure 35B:
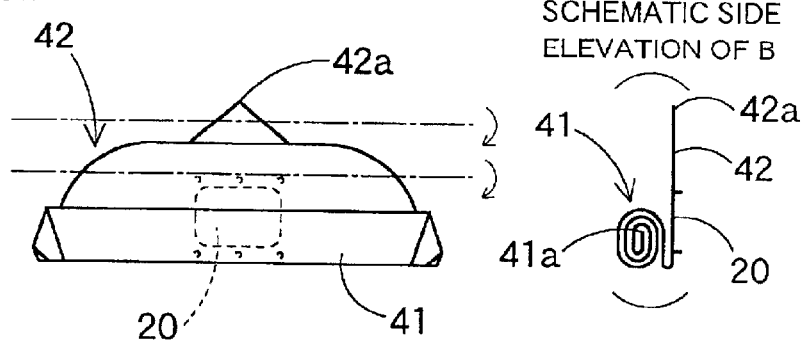
Figure 35C:
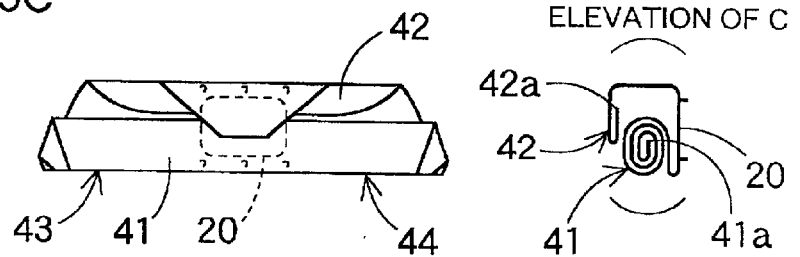
Figure 35D:
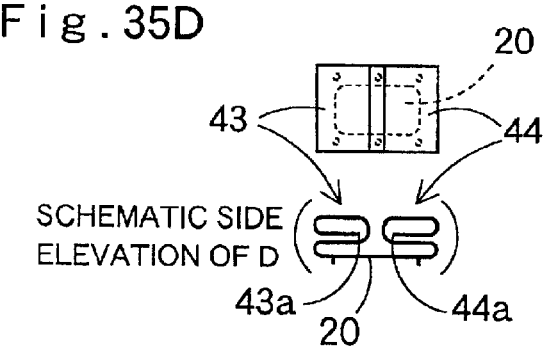

In this airbag 10B, at the preliminarily folding time, the upper edge near portion 29b of the peripheral wall portion 18 is so arranged over the gas inlet port 20 as to confront the gas inlet port 20. This upper edge near portion 29b is located in the peripheral wall portion 18 near the upper edge 12 of the passenger's side wall portion 11. Therefore, at the initial extended/inflated stage of the airbag 10B, the upper edge near portion 29b is forcibly pushed upward in advance by the pushing force F (as referred to FIGS. 24 and 26) of the inflating gas G having just come in. Moreover, the passenger's side wall portion 11 is arranged on its upper edge 12 side near the upper edge near portion 29b. Therefore, the passenger's side wall portion 11 is also quickly arranged generally in the vertical direction as the upper edge near portion 29b is extended. At this time, the upper edge 12 itself of the passenger's side wall portion 11 is arranged on the back side of the rear edge 21b of the gas inlet port 20. Therefore, the passenger's side wall portion 11 being extended/inflated is arranged generally in the vertical direction while being suppressed in its height. As a result, the passenger's side wall portion 11 being extended/inflated and arranged generally vertically is moved backward, as shown in FIG. 30, while being suppressed in its height. This behavior of the airbag 10B can protect the passenger properly, when the seated passenger has a small height, without applying a partial pushing force to the passenger.

Moreover, the airbag 10B is flatly extended like the foregoing airbag 10 or 10A substantially all the area of the passenger's side wall portion 11 and is folded up on the side of the peripheral wall portion 18. Therefore, it is possible to acquire actions and effects similar to those of the aforementioned airbag 10 or 10A.

In connection with the preliminary folding of the peripheral wall portion 18, moreover, an airbag 10C may be preliminarily folded to form a preliminarily folded airbag 40C, as shown in FIGS. 31 to 34. Like the foregoing airbag 10, 10A or 10B, the airbag 10C is formed into the same shape as that of the airbag 10, 10A or 10B by using the first and second base cloths 35 and 36 and the straightening cloth material 38.

The airbag 40C is preliminarily folded from the airbag 10C by arranging the valley crease CH in the peripheral wall portion 18 on the back side of the rear edge 21b of the gas inlet port 20. This preliminary folding is done, like the aforementioned preliminary folding of the airbag 10B, by gripping and pulling the predetermined portions 31 and 13a of the airbag 10C while substantially all the area of the passenger's side wall portion 11 being flatly extended. The gripped portion 31 is located at the peripheral wall portion 18 between the transversely central portion of the front edge 21a side of the gas inlet port 20 and the transversely central portion of the passenger's side wall portion upper edge 12. The gripped portion 13a is located at the transversely central portion of the lower edge 13 of the passenger's side base portion 11. On the other hand, this gripped portion 13a is located at the portion of the aforementioned airbag 10 or 10A on the back side of the gripped portion 26a. Moreover, the passenger's side wall portion 11 is moved backward, and the gripped portions 31 and 13a are gripped and pulled in the longitudinal direction away from each other. In the airbag 10C, the gripped portion 13a is then largely pulled.

In this preliminarily folded airbag 40C, the valley crease CH in the peripheral wall portion 18 is arranged on the back side of the rear edge 21b of the gas inlet port 20 but near the rear edge 21b. In the preliminarily folded airbag 40C, more specifically, the upper side peripheral wall 29 of the peripheral wall portion 18 is folded up and arranged within a range on the front side from the vicinity of the rear edge 21b of the gas inlet port 20.

On the other hand, this preliminarily folded airbag 40C is folded up horizontally and vertically like the preliminarily folded airbag 40B, as shown in FIGS. 35A, 35B, 35C and 35D. First of all, the portion 41 of the preliminarily folded airbag 40C on the back side of the gas inlet port 20 is folded to form transverse creases and is rolled to bring the end portion 41a close to the gas inlet port 20. Next, the portion 42 on the front side of the gas inlet port 20 is folded to form transverse creases and is folded back to bring the end portion 42a close to the gas inlet port 20. After this, the left side portion 43 and the right side portion 44 of the gas inlet port 20 are folded to form longitudinal creases and is vertically folded to bring the end portions 43a and 44a close to the gas inlet port 20.

The folded-up airbag 10C is assembled like the airbag 10, 10A or 10B in the airbag device M and is mounted on the vehicle.

In this airbag 10C, at the preliminarily folded airbag 40C, the valley crease CH in the peripheral wall portion 18 is arranged on the back side of the rear edge 21b of the gas inlet port 20. Therefore, the pushing force F of the inflating gas G cannot be applied directly to the upper edge near portion 16 unlike the aforementioned airbag 10 or 10A. In this airbag 10C, however, in the preliminarily folded airbag 40C, the upper side peripheral wall 29 of the peripheral wall portion 18 is folded up and arranged within the range on the front side from the vicinity of the rear edge 21b of the gas inlet port 20. When the inflating gas G comes in from the gas inlet port 20, therefore, the upper edge near portion 16 of the passenger's side wall portion 11 is pushed up through the upper side peripheral wall 29, and the upper side peripheral wall 29 itself is also pushed up. At this time, the upper side peripheral wall 29 is released from its folded state as it is pushed up, and leaves the gas inlet port 20. Even if the valley crease CH in the peripheral wall portion 18 is arranged on the back side of the rear edge 21b of the gas inlet port 20, more specifically, the upper side peripheral wall 29 is released from its folded state, and the upper edge near portion 16 of the passenger's side wall portion 11 confronts the gas inlet port 20 directly. As a result, the passenger's side wall portion 11 can be easily arranged generally in the vertical direction.

Moreover, the airbag 10C is flatly extended like the foregoing airbag 10 or 10A substantially all the area of the passenger's side wall portion 11 and is folded up on the side of the peripheral wall portion 18. Therefore, it is possible to acquire actions and effects similar to those of the aforementioned airbag 10 or 10A.

Figure 36:
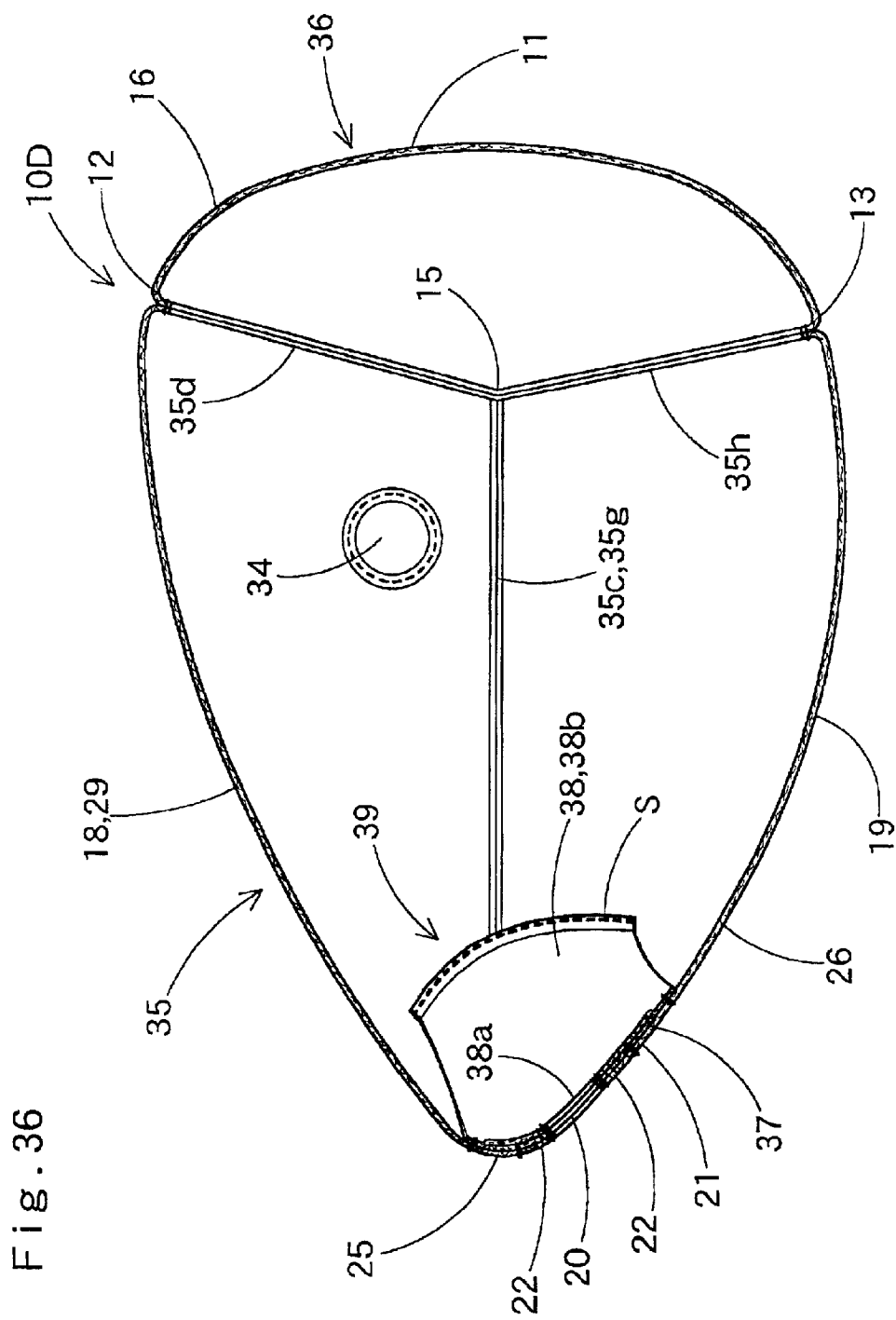
FIG. 36 is a sectional view showing the state, in which an airbag of still another embodiment is inflated by itself, and taken in the longitudinal direction of the vehicle.

As shown in FIG. 36, moreover, an airbag 10D elongated as its own shape at the end of inflation is preliminarily folded in the following manner.

Figure 37:
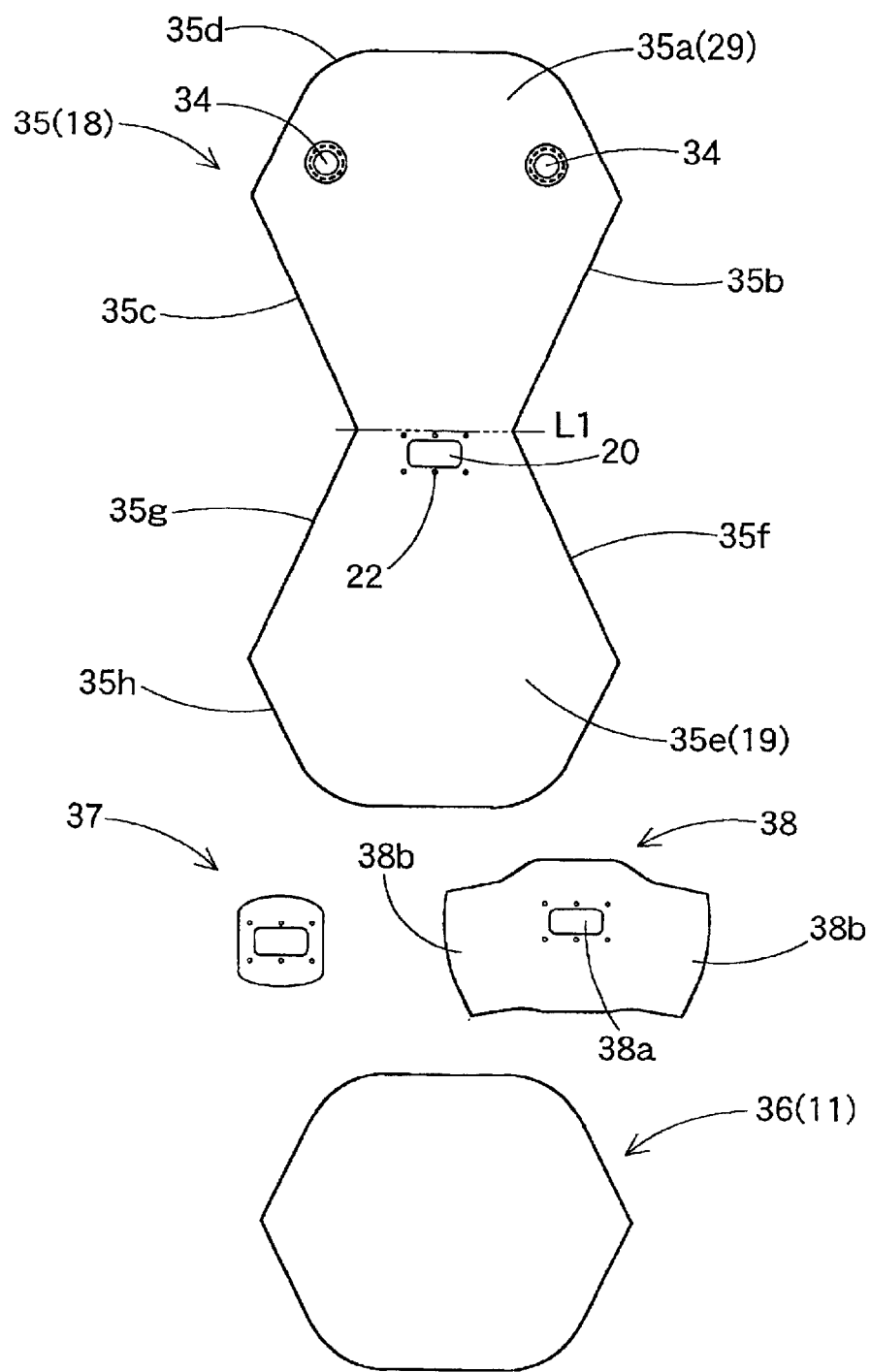
FIG. 37 is a top plan view showing a member to construct the airbag shown in FIG. 36.
Figure 38:
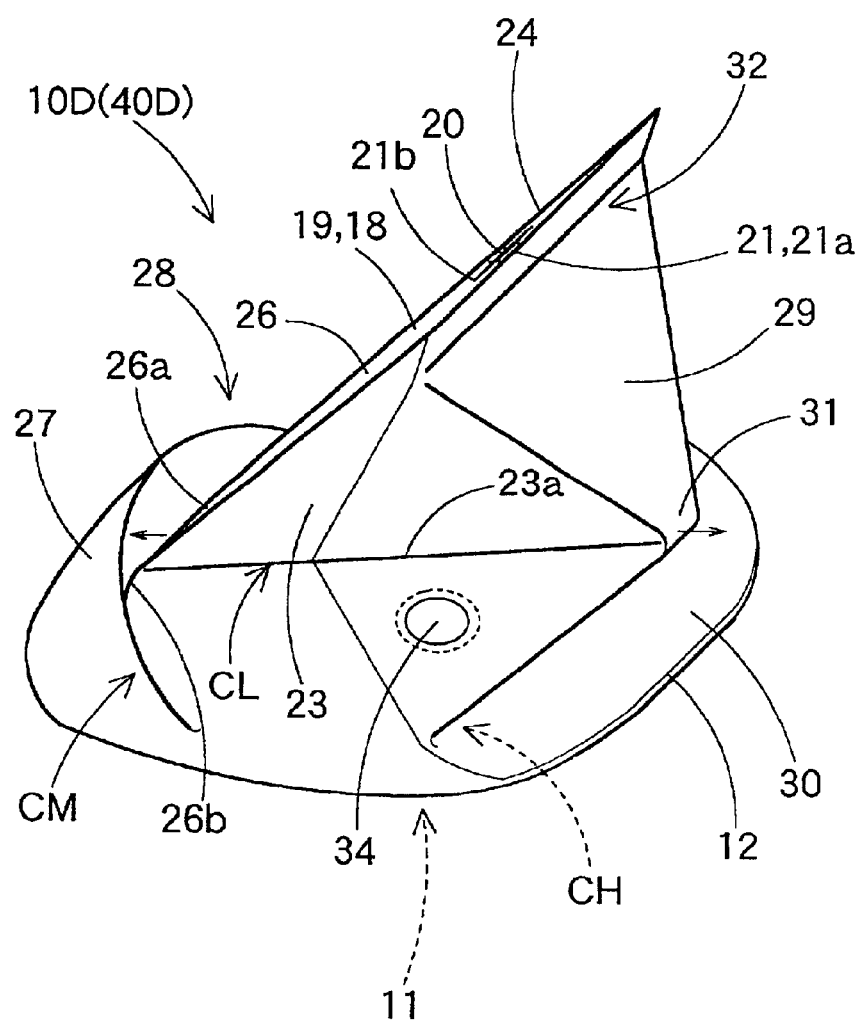
FIG. 38 is a perspective view showing the folds when the preliminarily folded airbag shown in FIG. 36 is preliminarily folded.
Figure 39:
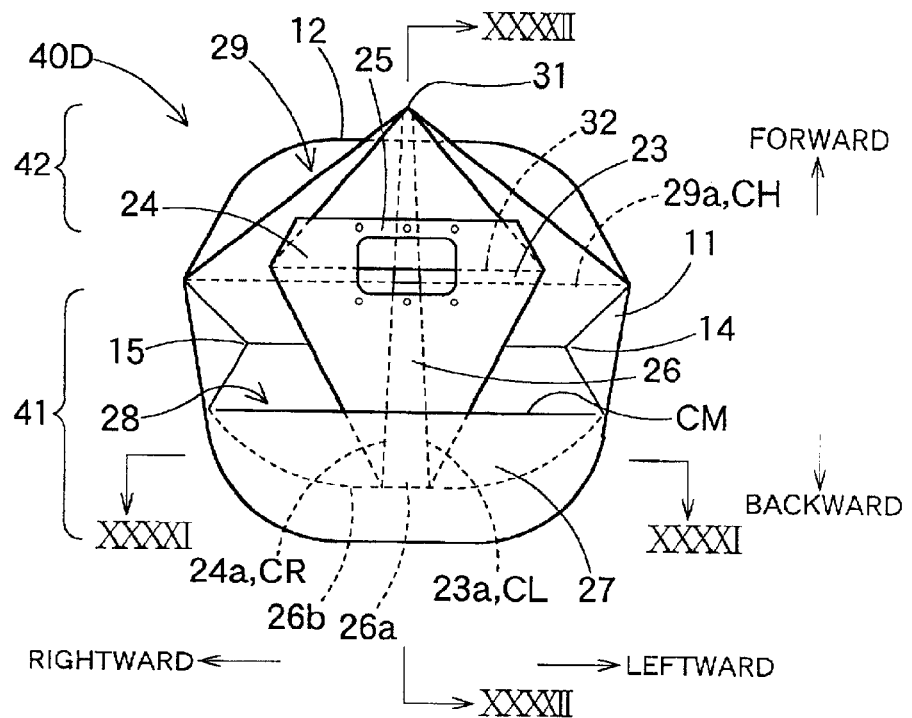
FIG. 39 is a view showing the airbag shown in FIG. 36 and is taken from the side of the gas inlet port.
Figure 40:
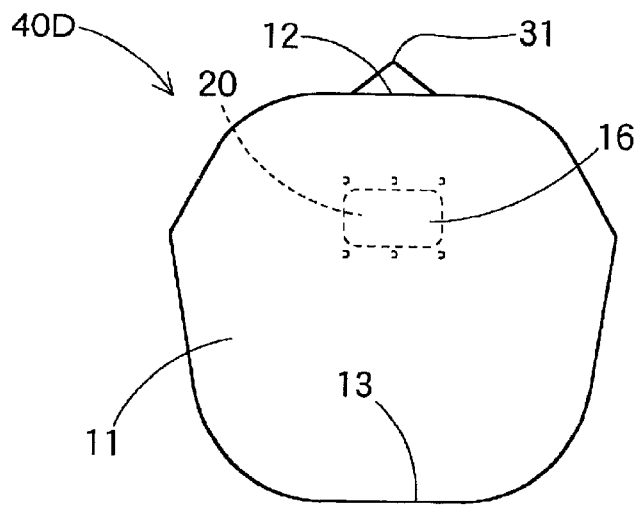
FIG. 40 is a view showing the preliminarily folded airbag shown in FIG. 39 and is taken from the side of the passenger's side wall portion.
Figure 41:
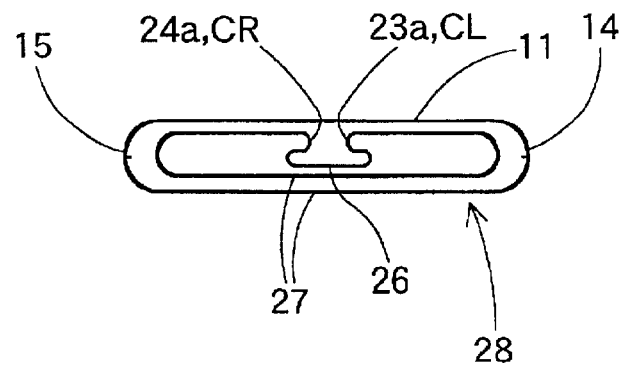
FIG. 41 is an end face view taken along line XXXXI—XXXXI of FIG. 39.
Figure 42:
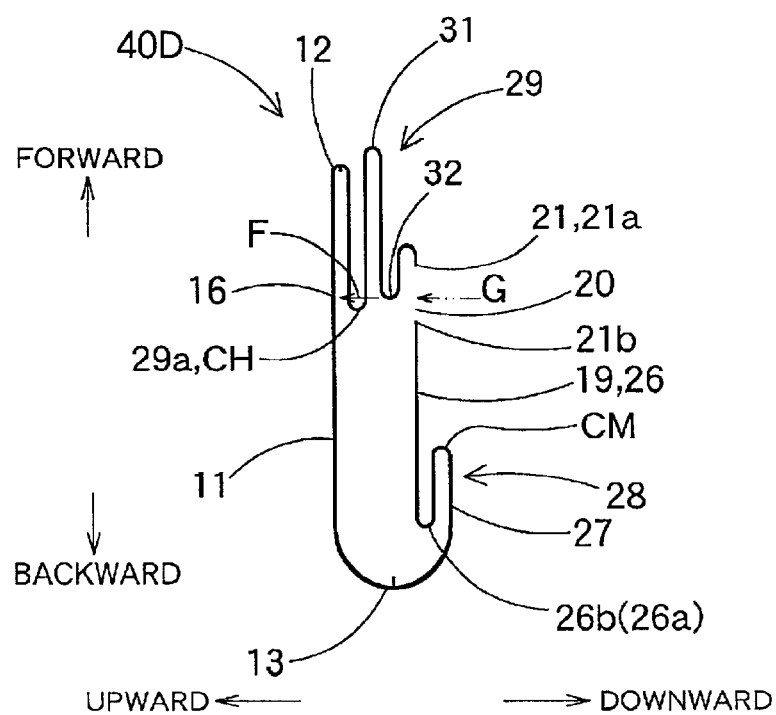
FIG. 42 is an end face view taken along line XXXXII—XXXXII of FIG. 39.
Figure 43A:
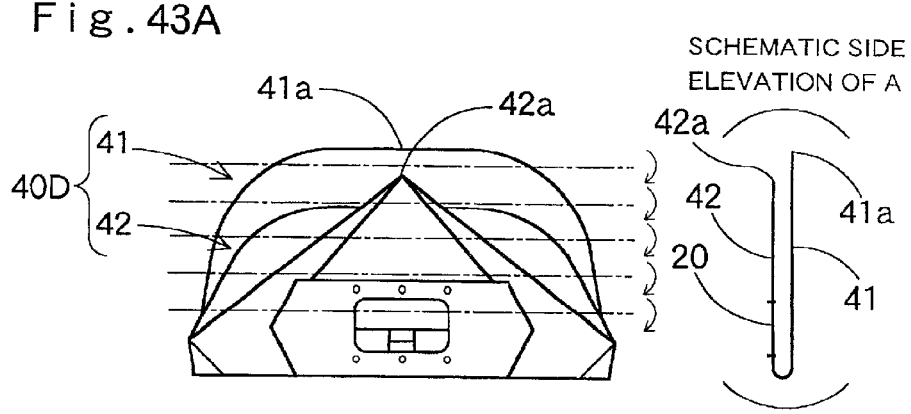
FIGS. 43A to 43D are views showing the folding-up steps after the airbag shown in FIG. 36 was preliminarily folded.
Figure 43B:
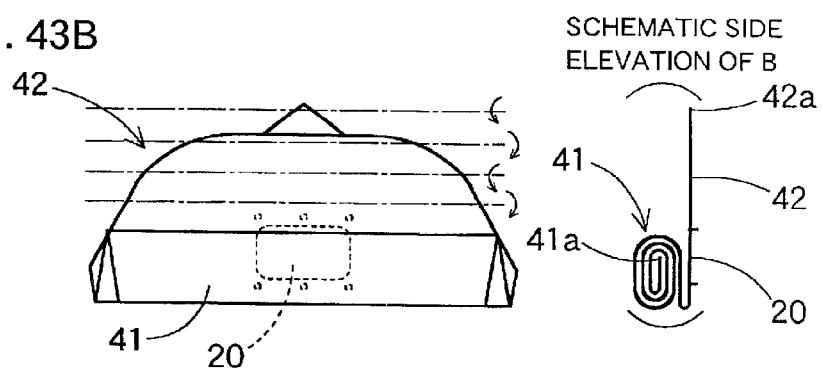
Figure 43C:
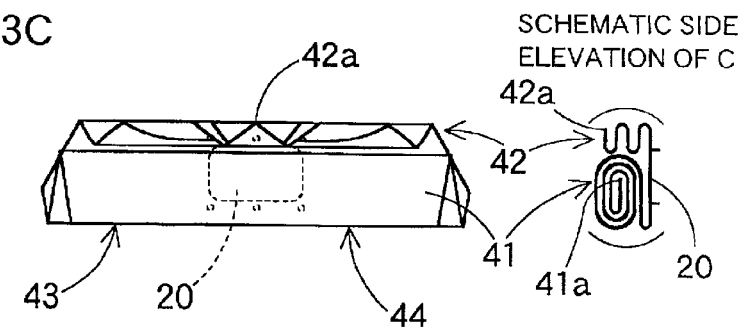
Figure 43D:
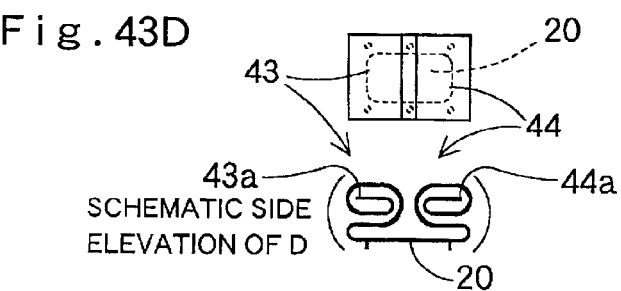

Here in this airbag 10D, as shown in FIGS. 36 and 37, the longitudinal distance from the gas inlet port 20 to the passenger's side wall portion 11 is made larger than that of the airbag 10. Specifically, the side edge portions 35b, 35f, 35c and 35g, as positioned close to each other, of the upper side portion 35a and the lower side portion 35e of the first base cloth 35 are made longer than those of the corresponding portions of the first base cloth 35 of the airbag 10. Moreover, the second base cloth 36 of the airbag 10D is made slightly larger in its entire contour than the second base cloth 36 of the airbag 10. The airbag 10D is slightly different in the aforementioned sizes and shape from the airbag 10, and the descriptions of the common members and the common portions will be omitted by designating them by the identical reference numerals. Thus, the airbag 10D can be manufactured by stitching those components 35, 36, 37 and 38 by using the stitching thread S as in the airbag 10.

The preliminary folding for forming a preliminarily folded airbag 40D from the airbag 10D is made like that of the foregoing airbag 10 or 10A. Specifically, the preliminary folding of the airbag 10D is done by gripping and pulling the predetermined portions 31 and 26a of the airbag 10D with substantially all the area of the passenger's side wall portion 11 being flatly extended, as shown in FIGS. 38 to 42. The gripped portion 31 is located at the substantially intermediate portion of the peripheral wall portion 18 between the transversely central portion of the front edge 21a side of the gas inlet port 20 and the transversely central portion of the passenger's side wall portion upper edge 12. On the other hand, the gripped portion 26a is located at the transversely central portion of the peripheral wall portion 18 on the back side of the gas inlet port 20. Moreover, the gripped portions 31 and 26a are longitudinally pulled away from each other. At this time, the portion 23 of the peripheral wall portion 18 on the left side of the gas inlet port 20 is folded up to form the valley crease CL. Likewise, the portion 24 of the peripheral wall portion 18 on the right side of the gas inlet port 20 is folded up to form the valley crease CR. Moreover, the portion 30 of the peripheral wall portion 18 near the joint to the passenger's side wall portion upper edge 12 is folded up to form the valley crease CH. In this case, the gripped portion 26a of the rear side portion 26 at the back of the gas inlet port 20 is located apart from the lower edge 13 of the passenger's side wall portion 11. Moreover, a portion 27 near the rear end closer to the passenger's side wall portion lower edge 13 than the gripped portion 26a is folded up to cover the gripped portion 26a with a crease CM. This crease CM is a ridge in the transverse direction. The preliminary folding can be completed when the airbag 10D is thus folded up.

The airbag 40D thus preliminarily folded is folded up horizontally and vertically like the preliminarily folded airbag 40 or 40A, as shown in FIGS. 43A, 43B, 43C and 43D. First of all, the portion 41 of the preliminarily folded airbag 40D on the back side of the gas inlet port 20 is folded to form transverse creases and is rolled to bring the end portion 41a close to the gas inlet port 20. Next, the portion 42 on the front side of the gas inlet port 20 is folded to form transverse creases and is folded in a bellows to bring the end portion 42a close to the gas inlet port 20. After this, the left side portion 43 and the right side portion 44 of the gas inlet port 20 are folded to form longitudinal creases and is vertically folded to bring the end portions 43a and 44a close to the gas inlet port 20.

The folded-up airbag 10D is assembled like the airbag 10, 10A, 10B or 10C in the airbag device M and is mounted on the vehicle.

This airbag 10D can attain actions and effects similar to those of the foregoing airbag 10 or 10A when it is extended/inflated. In the preliminarily folded airbag 40D, moreover, the vicinity 26b (or the gripped portion 26a) of the substantially intermediate portion in the lower side peripheral wall 19 of the peripheral wall portion 18 between the gas inlet port 20 and the passenger's side wall portion lower edge 13 is arranged close to the side of the lower edge 13 of the passenger's side wall portion 11. Moreover, this gripped portion 26a is so folded in that it is arranged on the passenger's side wall portion 11 side of the rear end near portion 27 of the peripheral wall portion 18. In this folding shape, more specifically, the peripheral wall portion 18 is folded up to form a tuck 28 in the peripheral wall portion 18 on the back side of the gas inlet port 20 while extending substantially all the area of the passenger's side wall portion 11 flatly. Even if the distance of the airbag 10D from the gas inlet port 20 to the passenger's sidewall portion 11 is elongated to enlarge the longitudinal size of the lower side peripheral wall 19 of the peripheral wall portion 18, therefore, the airbag 10D can be easily preliminarily folded by adjusting the longitudinal size of the tuck 28.

Here, the following folding can easily cope with the case of the airbag 10D, in which the distance from the gas inlet port 20 to the passenger's side wall portion 11 is elongated. At the portion (or the upper side peripheral wall 29) of the peripheral wall portion 18 from the side of the front edge 21a of the gas inlet port 20 to the upper edge 12 of the passenger's side wall portion 11, more specifically, the folding may be done by enlarging the longitudinal size of the portion 29a to be folded in with the transverse crease CH. Alternatively, the valley crease may be formed in multiplicity. Here in the airbag 10D, the folded portion 29a is enlarged in the longitudinal direction.

When the airbag 10 of the embodiment is to be extended/inflated, on the other hand, the inflating gas G flows in from the gas inlet port 20 to push up the upper edge near portion 16 in the passenger's side wall portion 11, and the straightening cloth 39 is bulged upward. At this time, the inflating gas G interferes with the straightening cloth 39 so that it is branched into a gas GF to flow to the front side of the vehicle and a gas GB to flow to the back side (as referred to FIG. 4). Moreover, the straightening cloth 39 is so curved that the sectional shape in the longitudinal direction of the vehicle to confront the gas inlet port 20 when the gas G flows in is bulged in the direction to leave the gas inlet port 20. Therefore, the inflating gas GB to flow in from the gas inlet port 20 to the back side of the vehicle is turned along the curve of the straightening cloth 39 but not in parallel with the in-pane upper face 1a toward the upper face 1a of the in-pane 1 thereby to inflate the airbag 10. As a result, the folded-up portion 41 of the airbag 10 moves as far as possible backward along the upper face 1a of the in-pane 1. Therefore, the passenger's side wall portion 11 can be more widened.

Figure 47:
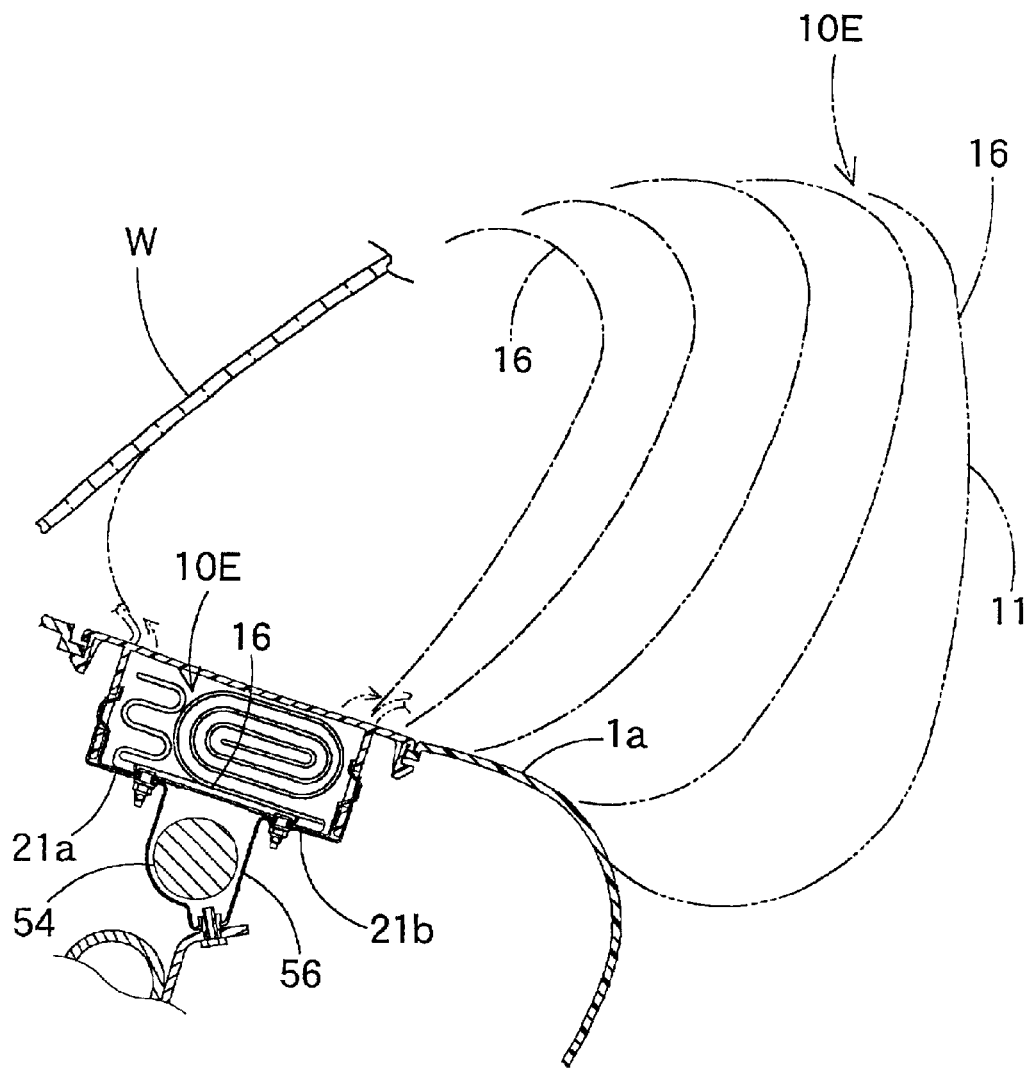
FIG. 47 is a view showing an extended/inflated state of an airbag of still another embodiment.

Here is shown in FIG. 47 the extended/inflated state of an airbag 10E which is constructed like the airbag 10 without the straightening cloth 39 and mounted on the vehicle. In this airbag 10E, as shown in FIG. 47, the upper edge near portion 16 of the passenger's side wall portion 11 is largely protruded. As a result, the passenger's side wall portion 11 is quickly arranged in the vertical direction.

In the airbag 10, 10A, 10B, 10C or 10D of the embodiment, moreover, the folding-up process is completed after the preliminary folding by folding it horizontally at first and then by folding it vertically. However, the folding-up process of the airbag 10, 10A, 10B, 10C or 10D should not be limited to that. For example, the preliminary folding may be followed by the vertical folding and then by the horizontal folding. Alternatively, the folding-up process may be completed by inserting the vertically folding step after the preliminary folding and midway of the horizontally folding step, and then by reopening the horizontally folding step. Moreover, the folding-up process may be completed by doing the vertically folding step after the preliminary folding, by inserting the horizontally folding step midway of the vertically folding step, and then by reopening the vertically folding step.

Figure 44:
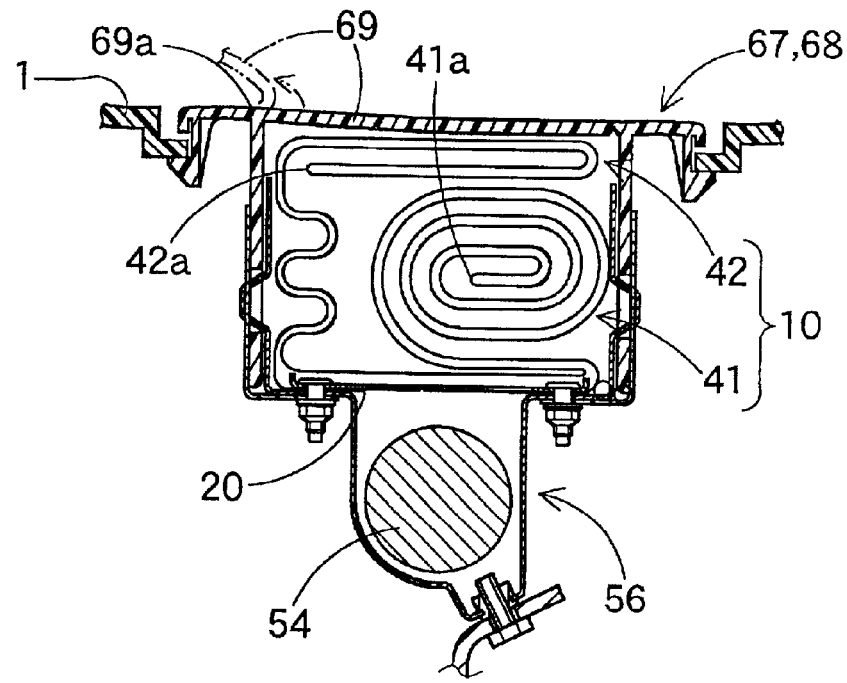
FIG. 44 is a view showing the horizontal folding of an airbag of still another embodiment.
Figure 45:
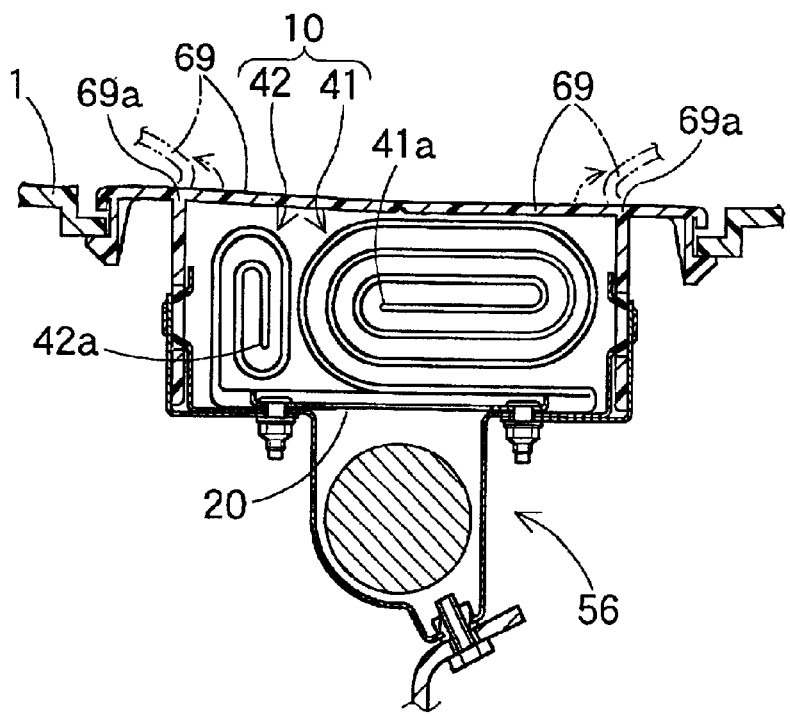
FIG. 45 is a view showing the horizontal folding of an airbag of still another embodiment.
Figure 46:
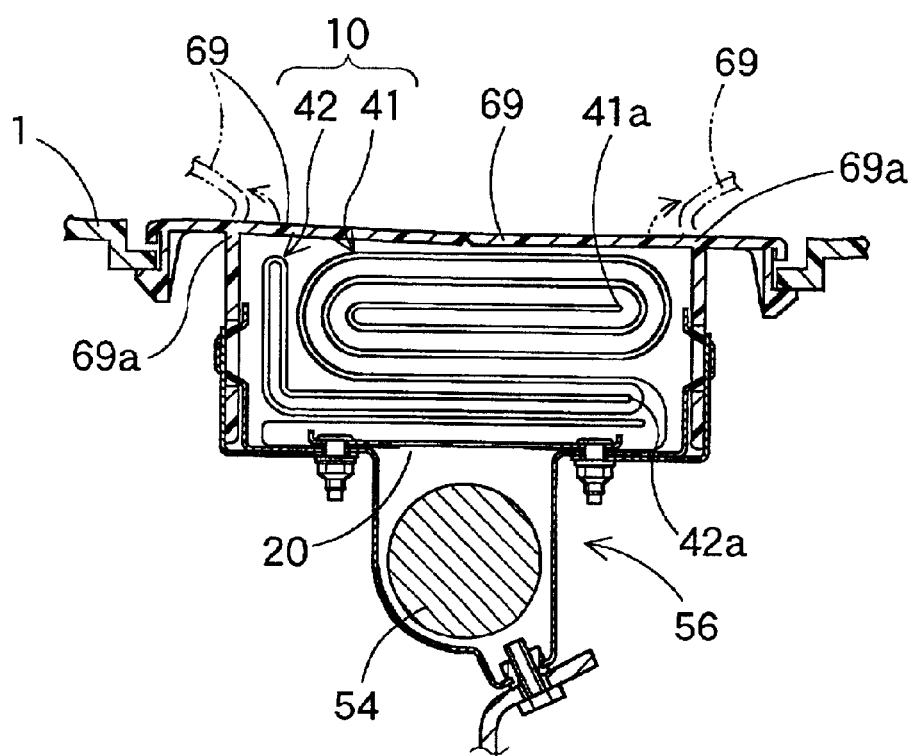
FIG. 46 is a view showing the horizontal folding of an airbag of still another embodiment.

On the transverse folding after the preliminary folding, moreover, the front side portion 42 may be folded up not by the bellows folding but by rolling the end portion 42a on the passenger's side wall portion 11, as shown in FIG. 44. As shown in FIG. 45, moreover, the front side portion 42 may be arranged over the folded-up rear side portion 41. As shown in FIG. 46, still moreover, the front side portion 42 may be arranged below the rear side portion 41 having the folded-up end portion 42a and in front of the folded-up rear side portion 41.

Figure 21A:
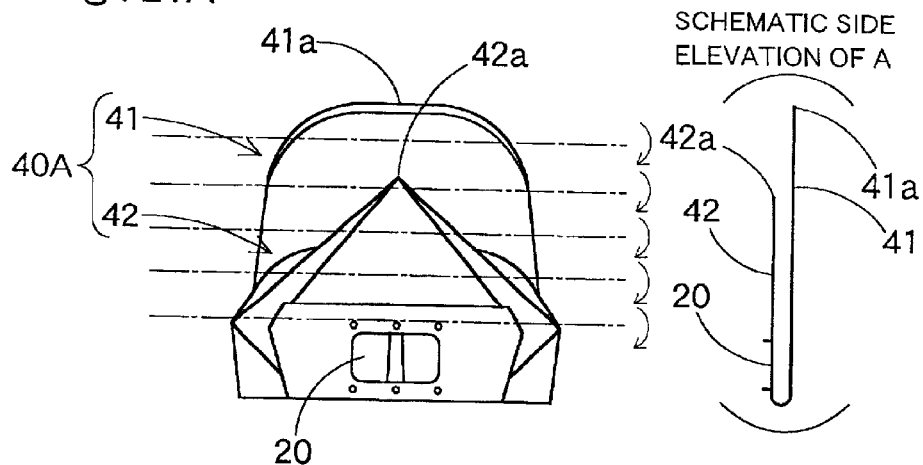
FIGS. 21A to 21D are views showing the folding-up steps after the airbag shown in FIG. 17 was preliminarily folded.
Figure 21B:
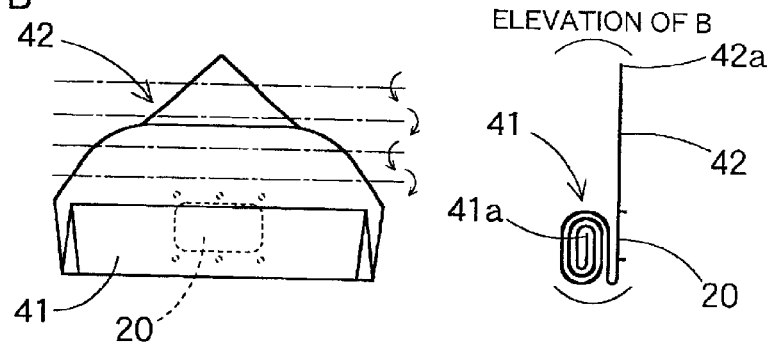
Figure 21C:
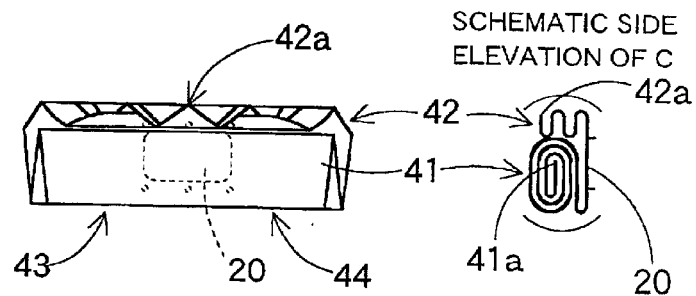
Figure 21D:
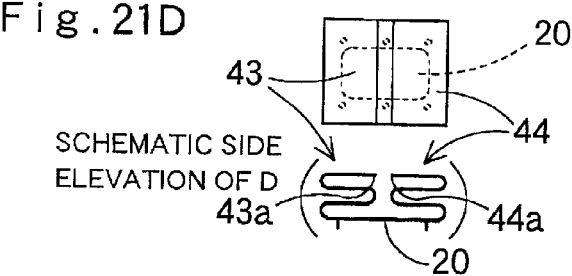
Figure 22:
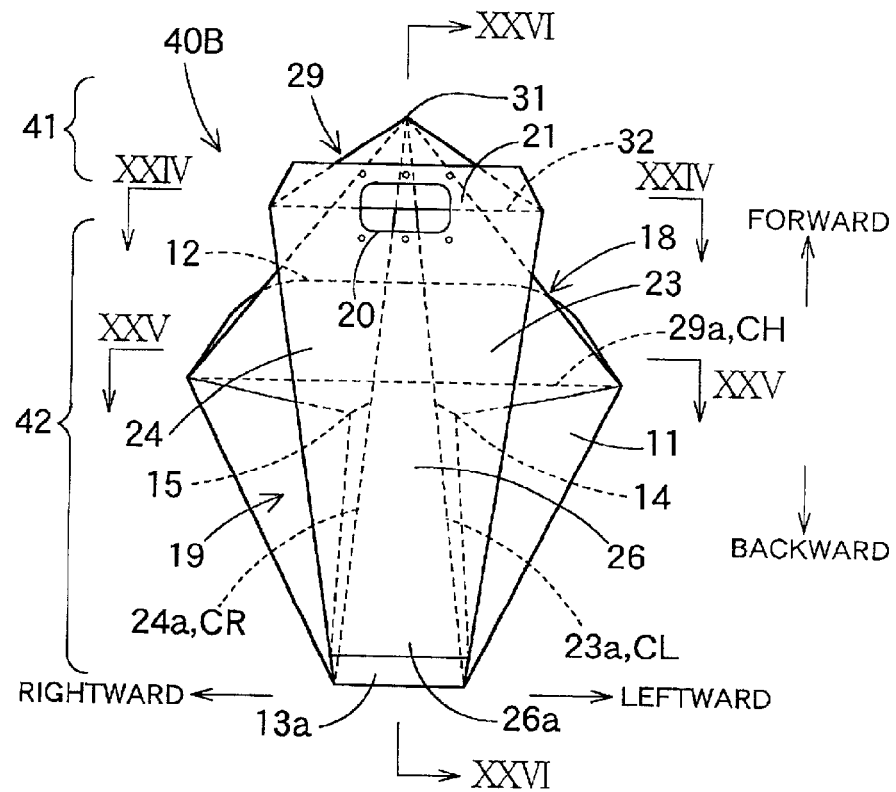
FIG. 22 is a view showing an airbag of still another embodiment, after preliminarily folded, and is taken from the side of the gas inlet port.
Figure 23:
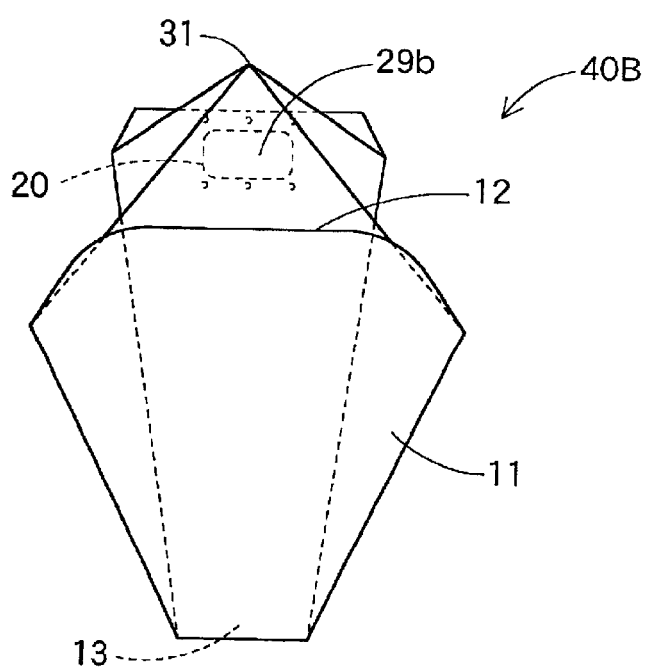
FIG. 23 is a view showing the preliminarily folded airbag shown in FIG. 22 and is taken from the side of the passenger's side wall portion.
Figure 24:
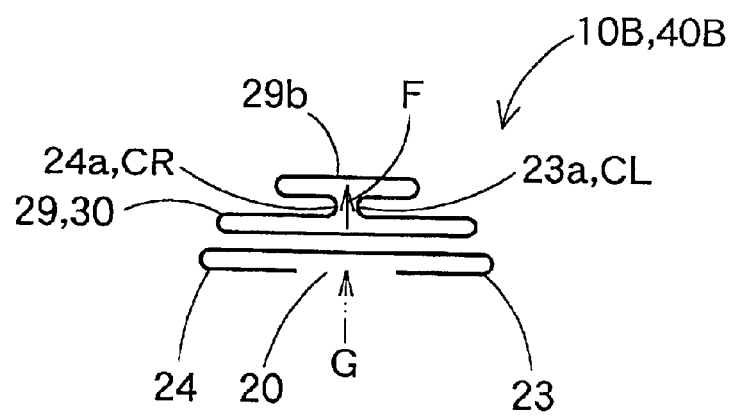
FIG. 24 is an end face view taken along line XXIV—XXIV of FIG. 22.
Figure 25:
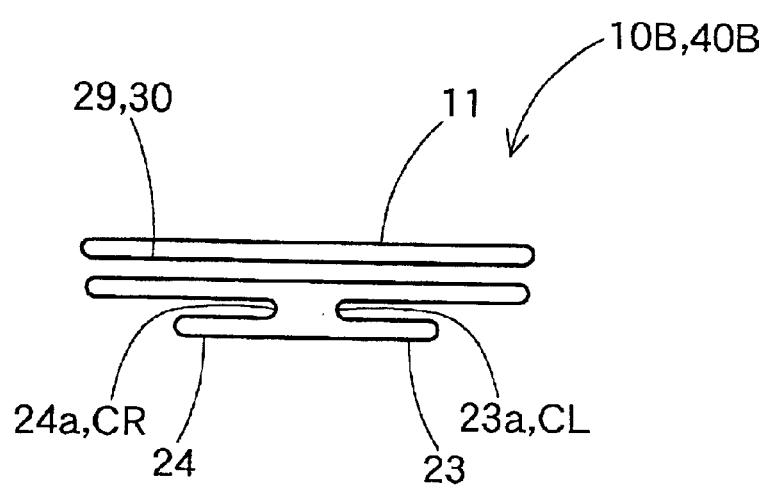
FIG. 25 is an end face view taken along line XXV—XXV of FIG. 22.
Figure 26:
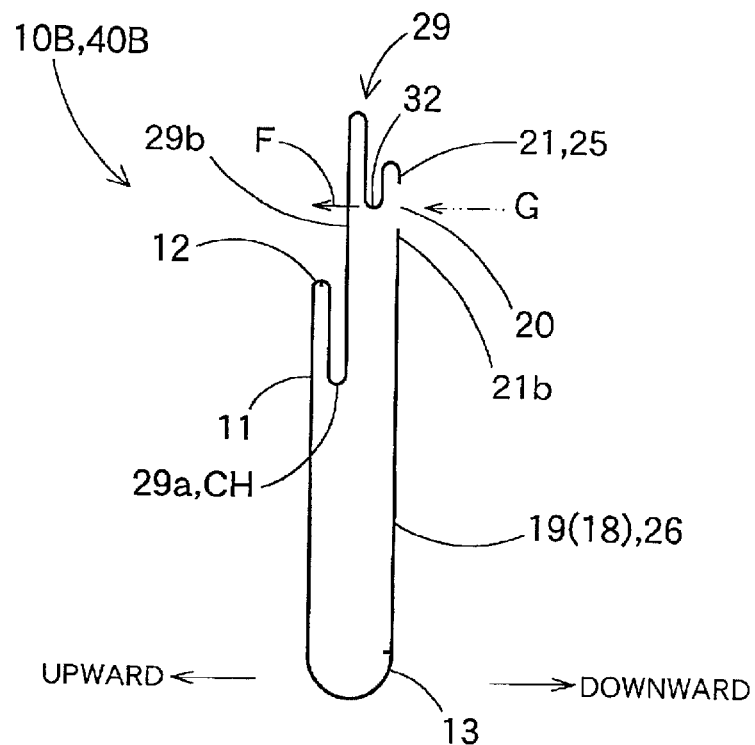
FIG. 26 is an end face view taken along line XXVI—XXVI of FIG. 22.
Figure 27:
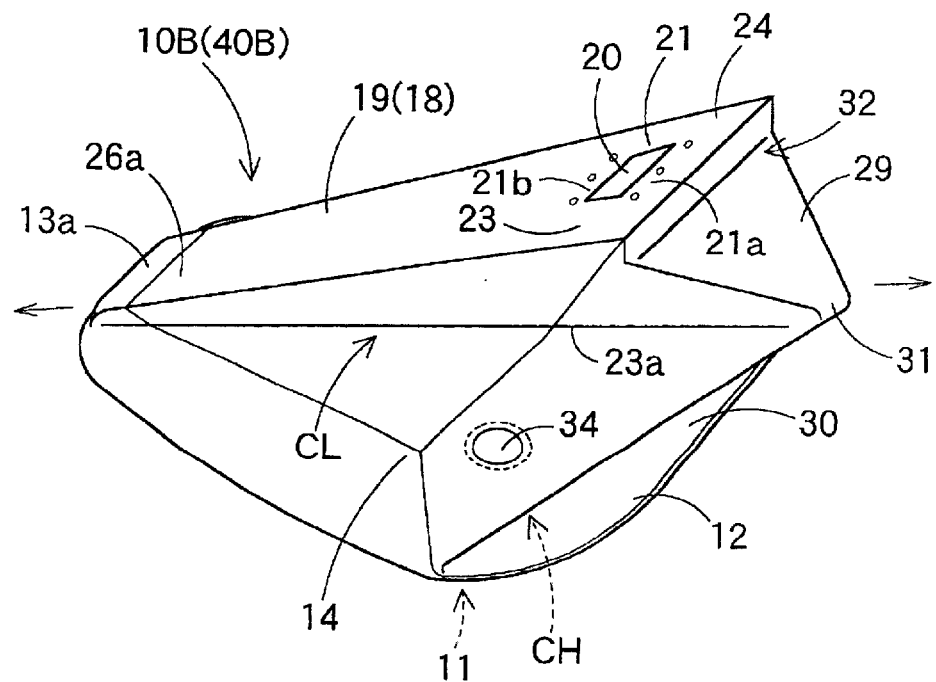
FIG. 27 is a perspective view showing the folds when the preliminarily folded airbag shown in FIG. 22 is preliminarily folded.
Figure 28A:
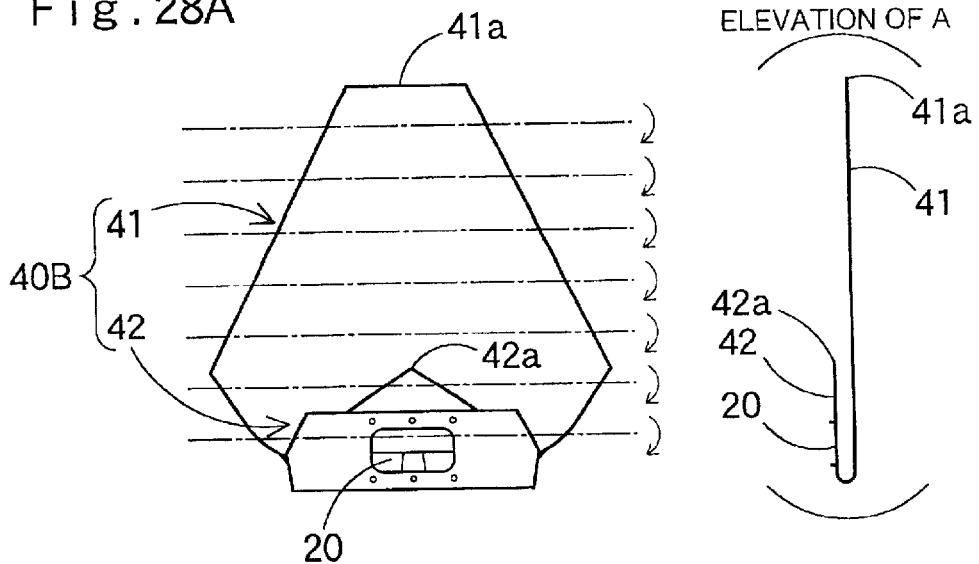
FIGS. 28A to 28D are views showing the folding-up steps after the airbag shown in FIG. 22 was preliminarily folded.
Figure 28B:
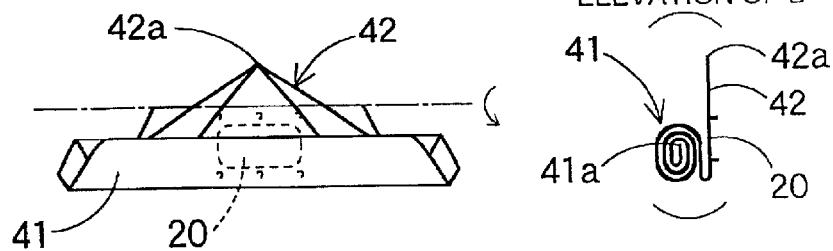
Figure 28C:
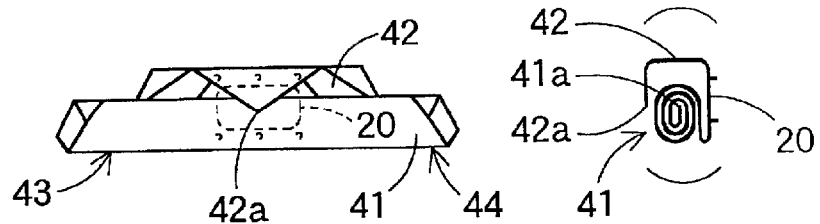
Figure 28D:
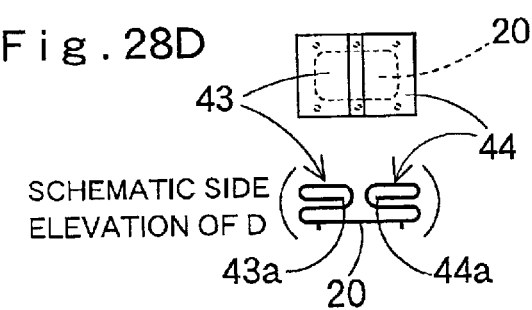

On the vertical folding after the preliminary folding, further more, the end portions 43a and 44a of the left and right side portions 43 and 44 may be not wound but folded in the bellows or normally rolled, as shown in FIG. 21D.

What is claimed is:

1. A passenger's seat airbag device comprising: an airbag folded up and housed in a case for being extended/inflated and protruded backward of a vehicle while pushing and opening a door arranged in an instrument panel, by introducing an inflating gas thereinto from a gas inlet port, wherein said airbag comprises, as a shape when completely extended/inflated:

a passenger's side wall portion arranged on the passenger's side and generally in a vertical direction; and a peripheral wall portion converging generally into a conical shape from the outer peripheral edge of said passenger's side wall portion forward of the vehicle, wherein said gas inlet port is arranged as an open face on a forward portion on the lower side of said peripheral wall portion when said airbag is completely extended/inflated, wherein said gas inlet port is mounted at its peripheral edge on said case, wherein said airbag is preliminarily folded to make the conical shape associated with the peripheral wall portion flat, and then vertically and horizontally folded, wherein in the preliminary folded shape of said airbag, a portion near the upper edge of said passenger's side wall portion is arranged at a position to confront said gas inlet port, and said passenger's side wall portion is expanded flatly on a part of said peripheral wall portion that becomes a lower side when the airbag is deployed;

wherein when said airbag is preliminarily folded, said peripheral wall portion is folded up such that substantially all the area of said passenger's side wall portion is expanded flatly;

wherein in the preliminarily folded shape of said airbag, the portions of said peripheral wall portion on the left and right sides of said gas inlet port are so folded to form valley creases in the longitudinal direction that the intermediate portion of the flatly extended passenger's side wall portion to the left and right edges is brought close to said gas inlet port and arranged at the peripheral edge of said gas inlet port on the side of said passenger's side wall portion, and wherein the portion of said peripheral wall portion near the joint to the upper edge of said passenger's side wall portion is folded to form valley creases in the transverse direction.

2. A passenger's seat airbag device according to claim 1, wherein in the preliminarily folded shape of said airbag, the portion of said peripheral wall portion on the upper side of said gas inlet port is folded up within the range on the forward portion from the vicinity of the rear edge of said gas inlet port.

3. A passenger's seat airbag device according to claim 1, wherein the valley creases in said peripheral wall portion near the joint to said passenger's side wall portion upper edge and in the transverse direction are arranged on a front side of the rear edge of said gas inlet port.

4. A passenger's seat airbag device according to claim 3, wherein the valley creases in said peripheral wall portion near the joint to said passenger's side wall portion upper edge and in the transverse direction are arranged on a front side of the front edge of said gas inlet port.

5. A passenger's seat airbag device according to claim 1, wherein in the preliminarily folded shape of said airbag, the vicinity of an intermediate portion on the lower side of said peripheral wall portion between said gas inlet port and said passenger's side wall portion lower edge is so folded in that the intermediate portion is arranged close to the lower edge side of said passenger's side wall portion and near the rear end of said peripheral wall portion on the side of said passenger's side wall portion.

6. A passenger's seat airbag device according to claim 1, wherein in the preliminarily folded shape of said airbag, the portion to be arranged at a position to confront said gas inlet port is made of a portion of said peripheral wall portion near the upper edge of said passenger's side wall portion, and wherein the upper edge of said passenger's side wall portion is arranged on the back side of the rear edge of said gas inlet port.

7. A passenger's seat airbag device according to claim 1, wherein in the preliminarily folded shape of said airbag, said gas inlet port is arranged at a front side of a longitudinal center of said airbag.

* * * * *